US010805537B2

(12) United States Patent
Li

(10) Patent No.: US 10,805,537 B2
(45) Date of Patent: Oct. 13, 2020

(54) IMAGING CONTROL METHOD, IMAGING DEVICE, AND COMPUTER READABLE STORAGE MEDIUM

(71) Applicant: Guangdong OPPO Mobile Telecommunications Corp., Ltd., Dongguan, Guangdong (CN)

(72) Inventor: Xiaopeng Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 3 days.

(21) Appl. No.: 16/180,289

(22) Filed: Nov. 5, 2018

(65) Prior Publication Data
US 2019/0281219 A1 Sep. 12, 2019

(30) Foreign Application Priority Data

Mar. 6, 2018 (CN) .......................... 2018 1 0183375

(51) Int. Cl.
H04N 5/232 (2006.01)
H04N 5/235 (2006.01)
H04N 5/343 (2011.01)
H04N 5/355 (2011.01)
H04N 5/347 (2011.01)

(52) U.S. Cl.
CPC ....... *H04N 5/23245* (2013.01); *H04N 5/2351* (2013.01); *H04N 5/2353* (2013.01); *H04N 5/2355* (2013.01); *H04N 5/343* (2013.01); *H04N 5/347* (2013.01); *H04N 5/35554* (2013.01); *H04N 5/35563* (2013.01); *H04N 5/2352* (2013.01)

(58) Field of Classification Search
CPC .......................... H04N 5/2351; H04N 5/23245
See application file for complete search history.

(56) References Cited

U.S. PATENT DOCUMENTS 5,128,769 A * 7/1992 Arai ....................... H04N 5/235
348/363
2007/0236567 A1 10/2007 Pillman et al.
2009/0207281 A1* 8/2009 Ono ..................... H04N 5/2351
348/234
(Continued)

FOREIGN PATENT DOCUMENTS

CN 101394473 A 3/2009
CN 101399919 A 4/2009
(Continued)

OTHER PUBLICATIONS

PCT/CN2019/074648 International Search Report dated Apr. 28, 2019.
(Continued)

*Primary Examiner* — Christopher K Peterson

(57) ABSTRACT

An imaging control method, an imaging device and a computer readable storage medium are provided. The imaging control method includes: obtaining a first gain index value according to an environment luminance value of a shooting environment and a preset target luminance value; and determining a shooting mode for shooting according to the first gain index value and preset switching condition information, the shooting mode including a bright light mode and a dark light mode.

20 Claims, 14 Drawing Sheets

(56) References Cited

U.S. PATENT DOCUMENTS

2009/0284616 A1    11/2009  Daiku
2014/0313400 A1    10/2014  Kaizu et al.
2016/0295135 A1*  10/2016  Sekiguchi .............. H04N 5/238

FOREIGN PATENT DOCUMENTS

| CN | 102881260 A | 1/2013 |
| CN | 103024279 A | 4/2013 |
| CN | 104301616 A | 1/2015 |
| CN | 105227858 A | 1/2016 |
| CN | 105578075 A | 5/2016 |
| CN | 105635532 A | 6/2016 |
| CN | 107026967 A | 8/2017 |
| CN | 108200354 A | 6/2018 |
| EP | 0409161 A2 | 1/1991 |
| EP | 2083565 A2 | 7/2009 |

OTHER PUBLICATIONS

EP 18210031.3 Search Report dated Jun. 14, 2019.
English translation of CN Refusal Decision for CN 201810183375.4 dated Mar. 4, 2020.

* cited by examiner

| | 1 | 2 | 3 | 4 | 5 | 6 | 7 | 8 |
|---|---|---|---|---|---|---|---|---|
| 1 | R (L) | R (M) | G (L) | G (M) | R (L) | R (M) | G (L) | G (M) |
| 2 | R (M) | R (S) | G (M) | G (S) | R (M) | R (S) | G (M) | G (S) |
| 3 | G (L) | G (M) | B (L) | B (M) | G (L) | G (M) | B (L) | B (M) |
| 4 | G (M) | G (S) | B (M) | B (S) | G (M) | G (S) | B (M) | B (S) |
| 5 | R (L) | R (M) | G (L) | G (M) | R (L) | R (M) | G (L) | G (M) |
| 6 | R (M) | R (S) | G (M) | G (S) | R (M) | R (S) | G (M) | G (S) |
| 7 | G (L) | G (M) | B (L) | B (M) | G (L) | G (M) | B (L) | B (M) |
| 8 | G (M) | G (S) | B (M) | B (S) | G (M) | G (S) | B (M) | B (S) |

IMAGING CONTROL METHOD, IMAGING DEVICE, AND COMPUTER READABLE STORAGE MEDIUM

CROSS-REFERENCE TO RELATED APPLICATION(S)

The present application claims priority to Chinese Patent Application No. 201810183375.4 filed on Mar. 6, 2018, the content of which is hereby incorporated by reference in its entirety.

TECHNICAL FIELD

Implementations of the present disclosure relate to, but are not limited to, electronic technology, in particular to an imaging control method, an imaging device and a computer readable storage medium.

BACKGROUND

With HDR (high dynamic range) technology, a pixel array may be controlled to expose and output multiple frame images sequentially with different exposure time, and then the multiple frame images may be fused to calculate a high dynamic range. However, in a dark environment, the frame images captured in this way have much noise and poor clarity and contrast.

SUMMARY

Implementations of the present disclosure provide an imaging control method, an imaging device, and a computer readable storage medium.

In one aspect, an imaging control method is provided, which may include: obtaining an environment luminance of a shooting environment; obtaining a first gain index according to the environment luminance of the shooting environment and a preset target luminance; and determining a shooting mode for shooting according to the first gain index and preset switching condition information, the shooting mode including a bright light mode and a dark light mode.

In another aspect, an imaging device is provided, which may include a processor and a memory storing computer readable instructions that are executable by the processor to perform actions of: obtaining an environment luminance of a shooting environment; obtaining a first gain index according to the environment luminance of the shooting environment and a preset target luminance; and determining a shooting mode for shooting according to the first gain index and preset switching condition information, the shooting mode including a bright light mode and a dark light mode.

In yet another aspect, a computer readable storage medium is provided, which contains computer executable instructions that are executable by a processor to perform actions of: obtaining an environment luminance of a shooting environment; obtaining a first gain index according to the environment luminance of the shooting environment and a preset target luminance; and determining a shooting mode for shooting according to the first gain index and preset switching condition information, the shooting mode including a bright light mode and a dark light mode.

Other features and advantages of the implementations of the present disclosure will be set forth in the following description and will partially become apparent from the description, or may be learned by implementing the implementations of present disclosure. The object and other advantages of the implementations of present disclosure can be realized and obtained by the structure particularly pointed out in the specification, claims and drawings.

BRIEF DESCRIPTION OF THE DRAWINGS

The accompanying drawings are used to provide a further understanding of the technical solutions of the present application and form a part of the specification, and are used together with the implementations of the present application to explain the technical solutions of the present application but do not constitute limitations on the technical solutions of the present application.

The above and/or additional aspects and advantages of the present disclosure will become apparent and easy to understand from the following description of implementations in conjunction with the accompanying drawings, wherein.

DETAILED DESCRIPTION

Figure 1:
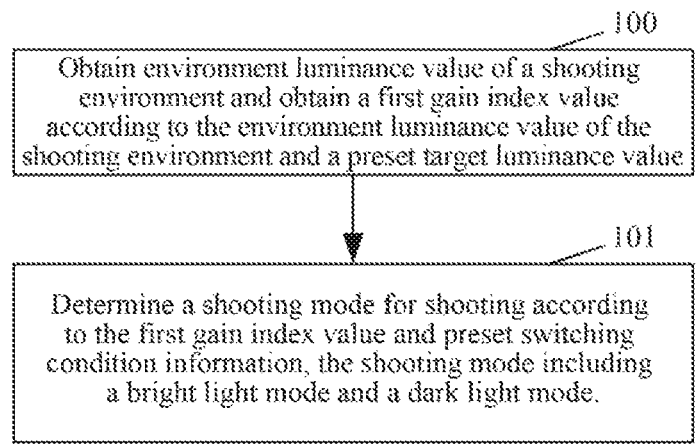
FIG. 1 is a flowchart of a first example of an imaging control method in an implementation of the present disclosure.
Figure 2:
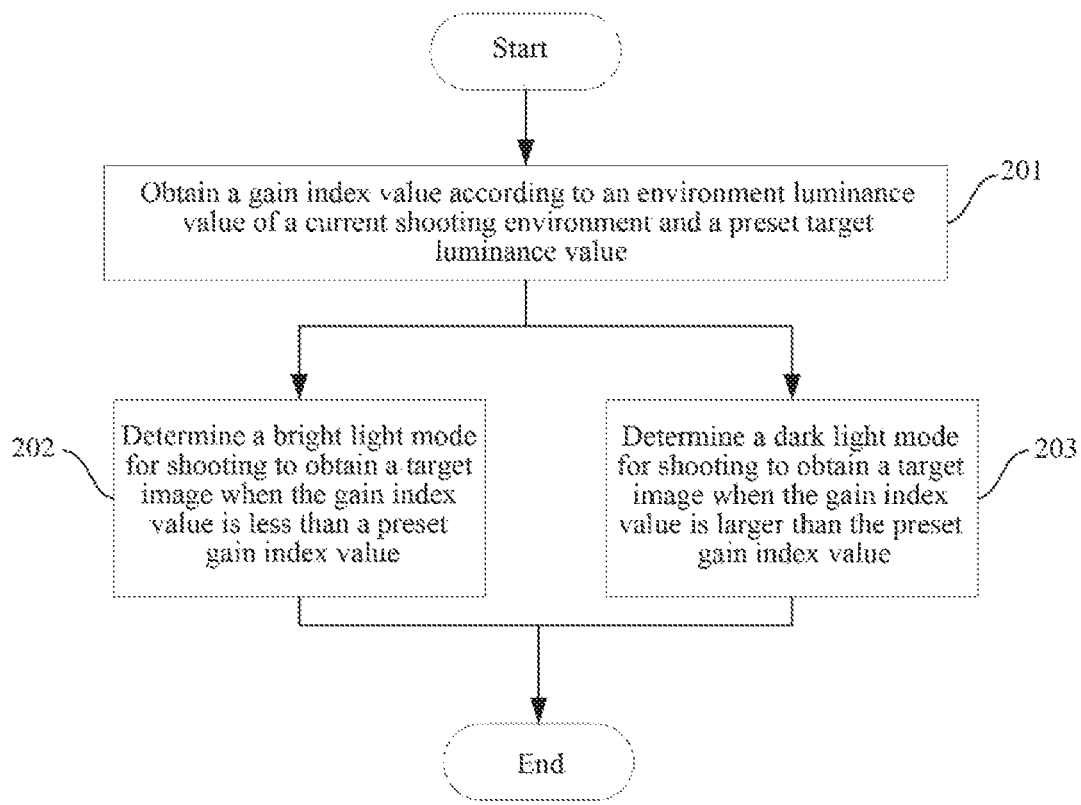
FIG. 2 is a flowchart of a second example of an imaging control method in an implementation of the present disclosure.

Implementations of the present disclosure are described in detail below, examples of which are shown in the accompanying drawings, wherein the same or similar reference numerals refer to the same or similar elements or elements having the same or similar functions throughout. The implementations described below with reference to the drawings are exemplary and are intended to explain the present disclosure and should not be construed as limiting the present disclosure.

An implementation of the present disclosure provides an imaging control method, and as shown in FIG. 1, the method may include the following actions 100-101.

In action 100, an environment luminance value of a shooting environment is obtained; and a first gain index value is obtained according to the environment luminance value of the shooting environment and a preset target luminance value.

In an exemplary example, this action may include: obtaining an environment luminance value; and obtaining the first gain index value based on a comparison of the environment luminance value with the target luminance value. When the environment luminance value is larger than the target luminance value, the larger the difference between the environment luminance value and the target luminance value is, the higher the luminance of the shooting environment is, and the less the obtained first gain index value is. When the environment luminance value is less than the target luminance value, the larger the difference between the environment luminance value and the target luminance value is, the lower the luminance of the shooting environment is, and the larger the obtained first gain index value is.

The imaging control method provided by the application may be applied to scenes such as photographing and video recording etc., which can adaptively determine the shooting mode according to the luminance condition of the environment.

In action 101, a shooting mode is determined for shooting according to the first gain index value and preset switching condition information, the shooting mode including a bright light mode and a dark light mode.

In the imaging control method of implementations of the application, the luminance situation of a current shooting environment is determined by obtaining a gain index value indicating the luminance of the environment, and a suitable shooting mode is selected for shooting according to the luminance situation of the current shooting environment, thereby improving the shooting experience of the user.

In an exemplary implementation, the switching condition information may include a preset gain index value, and action 101 may include: when the first gain index value is less than the preset gain index value, determining the bright light mode for shooting; and when the first gain index value is larger than the preset gain index value, determining the dark light mode for shooting.

Alternatively, when the first gain index value is equal to the preset gain index value, a bright light mode or a dark light mode may be determining for shooting.

Herein, the switching condition information may include a preset gain index value, a suitable shooting mode is selected for shooting simply according to the luminance condition of the current shooting environment, and the shooting experience of the user is improved.

In an exemplary implementation, the switching condition information may further include a preset gain index range, and the preset gain index value is within the preset gain index range. Accordingly, after determining the bright light mode for shooting, the method may also include: continuing to obtain a new gain index value (referred to as a second gain index value); when the second gain index value is less than or equal to the upper limit value of the preset gain index range, keeping the bright light mode for shooting; when the second gain index value is larger than the upper limit value of the preset gain index range, switching to the dark light mode for shooting.

Thereby, the problem of increasing the power consumption of an imaging device due to frequent switching of the working mode can be avoided, and the dark light mode is switched to timely when the environment luminance becomes low, thus ensuring the imaging quality of a shooting result.

In an exemplary implementation, when the newly obtained second gain index value is between the preset gain index value and the upper limit value of the preset gain index range, the method may further include: continuing to obtain a new gain index value (referred to as a third gain index value), and counting a duration when gain index values obtained continuously are between the preset gain index value and the upper limit value of the preset gain index range; and when the duration is larger than a preset duration, switching to the dark light mode for shooting, otherwise, keeping the bright light mode for shooting.

Thereby, on one hand, the problem of high power consumption caused by frequent switching of the working mode can be avoided, and on the other hand, a suitable working mode can be adopted timely according to change in environment luminance to obtain a shooting result with good quality.

In an exemplary implementation, the switching condition information may further include a preset gain index range, and the preset gain index value is within the preset gain index range. Accordingly, after shooting in the dark light mode, the method may also include: continuing to obtain a new gain index value (referred to as a second gain index value); when the second gain index value is larger than or equal to the lower limit value of the preset gain index range, keeping the dark light mode for shooting; and when the second gain index value is less than the lower limit value of the preset gain index range, switching to the bright light mode for shooting.

Thereby, the problem of increasing the power consumption of an imaging device due to frequent switching of the working mode is avoided, and the bright light mode is switched to timely when the environment luminance becomes high, thus ensuring the imaging quality of the shooting result.

In an exemplary implementation, when the newly obtained second gain index value is between the lower limit value of the preset gain index range and the preset gain index value, the method may further include: continuing to obtain a new gain index value (referred to as a third gain index value), and counting a duration when gain index values obtained continuously are between the lower limit value of the preset gain index range and the preset gain index value; and switching to the bright light mode for shooting when the duration is larger than a preset duration; otherwise, keeping the dark light mode for shooting.

Thereby, on one hand, the problem of high power consumption caused by frequent switching of the working mode is avoided, and on the other hand, a suitable working mode can be adopted timely according to change in environment luminance to obtain a shooting result with good quality.

In an exemplary implementation, the switching condition information may include a preset gain index range, and action 101 may include: when the first gain index value is less than the lower limit value of the preset gain index range, determining the bright light mode for shooting; when the first gain index value is larger than the upper limit value of the preset gain index range, determining the dark light mode for shooting; and when the first gain index value is within the preset gain index range, determining the bright light mode or the dark light mode for shooting, or keeping the shooting mode unchanged.

Herein, the switching condition information may include a preset gain index range, and a suitable shooting mode is selected for shooting simply according to the luminance condition of the current shooting environment, and the shooting experience of the user is improved.

An implementation of the application also provides an imaging device, which may include a processor and a memory storing computer readable instructions that are executable by the processor to perform actions of: obtaining an environment luminance value of a shooting environment; obtaining a first gain index value according to the environment luminance value of the shooting environment and a preset target luminance value; and determining a shooting mode for shooting according to the first gain index value and preset switching condition information, the shooting mode including a bright light mode and a dark light mode.

In an exemplary example, the imaging device may further include a pixel cell array including a plurality of pixel cells; wherein each pixel cell may include a long exposure pixel, a medium exposure pixel and a short exposure pixel; and the exposure time of the long exposure pixel is longer than the exposure time of the medium exposure pixel, and the exposure time of the medium exposure pixel is longer than the exposure time of the short exposure pixel.

In one exemplary example, the processor, when executing the computer readable instructions, may further perform actions of: controlling the pixel cell array to output a plurality of pieces of original pixel information under different exposure time; calculating merged pixel information respectively according to pieces of original pixel information with the same exposure time in a same pixel cell; and outputting a result of shooting in the bright light mode according to a plurality of pieces of the merged pixel information.

In an exemplary example, the processor, when executing the computer readable instructions, may further perform actions of: controlling the pixel cell array to output a plurality of pieces of original pixel information under different exposure time; calculating combined pixel information respectively by combining pieces of the original pixel information in a same pixel cell, each pixel cell corresponding to one piece of combined pixel information; outputting a result of shooting in the dark light mode according to a plurality of pieces of the combined pixel information.

In an exemplary example, an implementation of the present application also provides a computer readable storage medium containing computer executable instructions that are executable by a processor to perform actions of: obtaining a first gain index value according to an environment luminance value of a shooting environment and a preset target luminance value; and determining a shooting mode for shooting according to the first gain index value and preset switching condition information; wherein, the shooting mode may include a bright light mode and a dark light mode.

In an exemplary example, the present application also provides an imaging processing device, including a memory, a processor, and a computer program stored on the memory and executable by the processor. When the processor executes the computer program, the following actions are realized: obtaining a first gain index value according to the environment luminance value of the shooting environment and a preset target luminance value; switching shooting mode for shooting according to the first gain index value and preset switching condition information; wherein, the shooting mode may include a bright light mode and a dark light mode.

For ease of description, the following implementations will be described by taking only a photographing scenario as an example, which is not intended to limit the protection scope of this application.

Referring to FIGS. 2 to 4 and FIG. 6, an implementation of the present disclosure provides an imaging control method of an imaging device 30. The imaging device 30 may include a pixel cell array 31 and a filter cell array 32 disposed on the pixel cell array 31. The pixel cell array 31 may include a plurality of pixel cells 311, and each pixel cell 311 may include a plurality of photosensitive pixels 3111. The filter cell array 32 may include a plurality of filter units 322 corresponding to the plurality of pixel cells 311, each filter unit 322 covering a corresponding pixel cell 311. The pixel cell array 31 may be a Bayer array. The imaging control method may include the following actions 201-203.

In action 201, a gain index value (i.e., the aforementioned first gain index value) is obtained according to an environment luminance value of a current shooting environment and a preset target luminance value.

In action 202, when the gain index value is less than a preset gain index value, a bright light mode is determined for shooting to obtain a target image.

In action 203, when the gain index value is larger than the preset gain index value, a dark light mode is determined for shooting to obtain a target image.

Referring to FIGS. 3 to 6, an implementation of the present disclosure also provides a control device 10 for an imaging device 30. The imaging device 30 may include a pixel cell array 31 and a filter cell array 32 disposed on the pixel cell array 31. The pixel cell array 31 may include a plurality of pixel cells 311, and each pixel cell 311 may include a plurality of photosensitive pixels 3111. The filter cell array 32 may include a plurality of filter units 322 corresponding to the plurality of pixel cells 311, each filter unit 322 covering a corresponding pixel cell 311. The pixel cell array 31 may be a Bayer array. The control device 10 may include a first obtaining module 11, a first control module 12, and a second control module 13. Action 201 may be implemented by the first obtaining module 11. Action 202 may be implemented by the first control module 12. Action 203 may be implemented by the second control module 13. That is, the first obtaining module 11 may be configured to obtain a gain index value according to an environment luminance value of a current environment and a preset target luminance value. The first control module 12 may be configured to shoot in a bright light mode to obtain a target image when the gain index value is less than a preset gain index value. The second control module 13 may be configured to shoot in a dark light mode to obtain a target image when the gain index value is larger than the preset gain index value.

Figure 3:
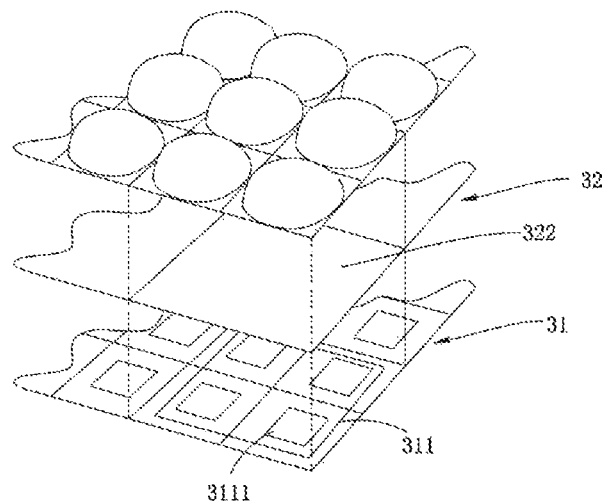
FIG. 3 is a schematic diagram of partial structure of an imaging device in an implementation of the present disclosure.
Figure 4:
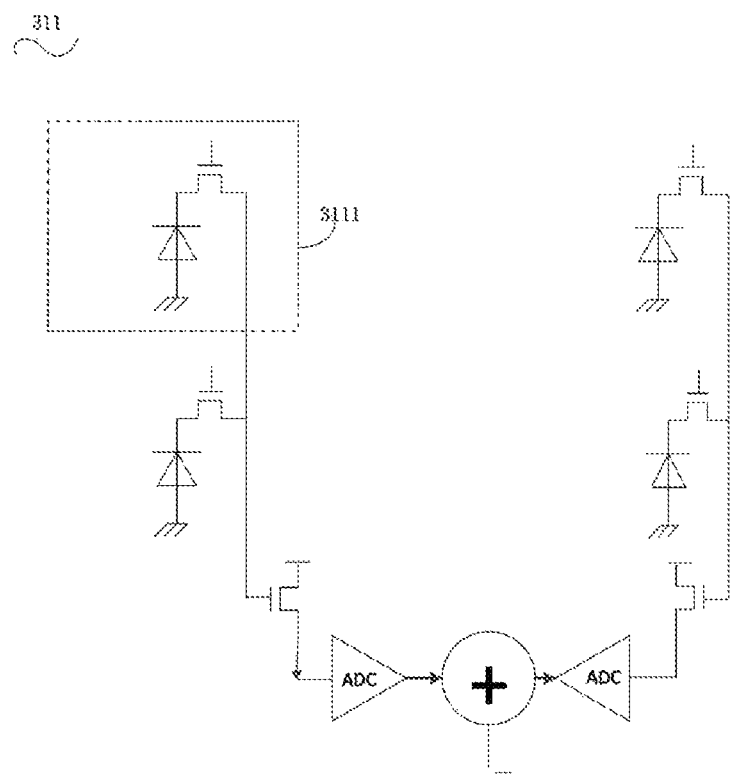
FIG. 4 is a schematic diagram of partial structure of a pixel cell array of an imaging device in an implementation of the present disclosure.
Figure 5:
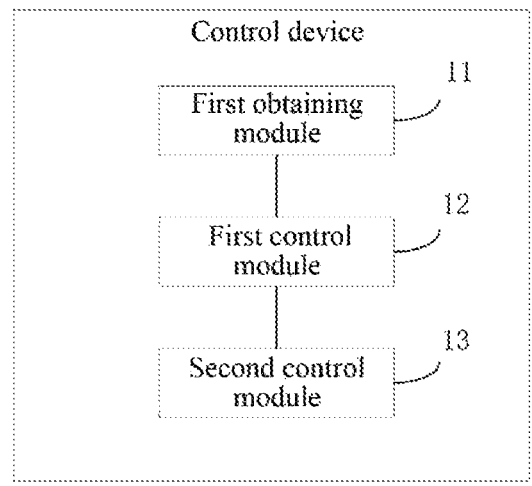
FIG. 5 is a block diagram of a control device in an implementation of the present disclosure.
Figure 6:
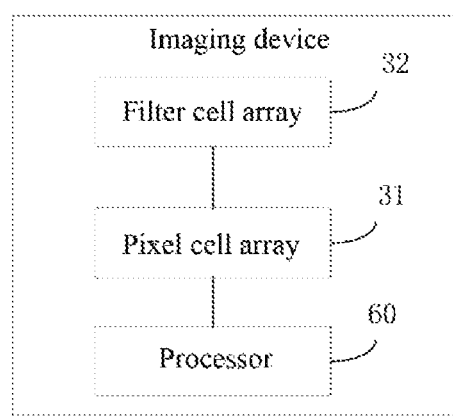
FIG. 6 is a block diagram of an imaging device in an implementation of the present disclosure.

Referring to FIGS. 3, 4, and 6, an implementation of the present disclosure also provides an imaging device 30. The imaging device 30 may include a pixel cell array 31 and a filter cell array 32 disposed on the pixel cell array 31. The pixel cell array 31 may include a plurality of pixel cells 311, and each pixel cell 311 may include a plurality of photosensitive pixels 3111. The filter cell array 32 may include a plurality of filter units 322 corresponding to the plurality of pixel cells 311, each filter unit 322 covering a corresponding pixel cell 311. The pixel cell array 31 may be a Bayer array. The imaging device 30 may also include a processor 60. The above action 201, action 202, and action 203 may all be implemented by the processor 60. That is, the processor 60 may be configured to obtain a gain index value according to an environment luminance value of a current environment and a preset target luminance value, shoot in a bright light mode to obtain a target image when the gain index value is less than a preset gain index value, and shoot in a dark light mode to obtain a target image when the gain index value is larger than the preset gain index value.

When the imaging device 30 is operating, the environment luminance value of a current environment is first obtained, and a gain index value is obtained according to the environment luminance value and a preset target luminance value. The gain index value is used to indicate the luminance of the current environment. The gain index value corresponds to a gain value of the imaging device. When the gain value of the imaging device is large, the gain index value is also large. At this time, the photosensitive pixel 3111 detects less light and a level signal generated is small. A large gain value is needed to increase the level signal for subsequent calculation of the target image. Therefore, when the gain index value is large, it indicates that the luminance of the current environment is low. When the gain value of the imaging device is small, the gain index value is also small. At this time, the photosensitive pixel 3111 detects more light and a level signal generated is large. Thus only a small gain value is needed to increase the level signal for subsequent calculation of the target image. Therefore, when the gain index value is small, it indicates that the luminance of the current environment is high.

That is, when the environment luminance value of the shooting environment is larger than the preset target luminance value, the larger the difference between the environment luminance value and the target luminance value is, the less the gain index value is, indicating a higher luminance of the shooting environment.

When the environment luminance value of the shooting environment is less than the preset target luminance value, the larger the difference between the environment luminance value and the target luminance value is, the larger the gain index value is, indicating a lower luminance of the shooting environment.

In an exemplary implementation, the switching condition information may include a preset gain index value. For example, the preset gain index value may be 460. Of course, the preset gain index value may be other values. Each time the imaging device 30 obtains the gain index value corresponding to the current environment, the processor 60 compares the gain index value with the preset gain index value. If the gain index value is less than the preset gain index value, the target image is shot in the bright light mode (the imaging device 30 works in the bright light mode by default when turned on). If the gain index value is larger than the preset gain index value, the processor 60 switches to the dark light mode to shoot the target image. The bright light mode and the dark light mode correspond to a bright environment and a dark environment respectively. An imaging effect of the target image shot in the bright light mode is better in a bright environment, and the imaging effect of the target image shot in the dark light mode is better in a dark environment.

With the imaging control method, the control device 10 and the imaging device 30 provided in implementations of the present disclosure, the luminance condition of the current environment is determined by obtaining the gain index value indicating the luminance of the environment, and a suitable shooting mode is selected according to the determination result to shoot the target image to obtain a better image effect, thereby improving the shooting experience of the user.

In some implementations, when the obtained gain index value is equal to the preset gain index value, the imaging device 30 may shoot the target image in the bright light mode, or may shoot the target image in the bright light mode, or may keep the previous shooting mode unchanged. In an exemplary implementation, if the working mode of the imaging device 30 at a certain time is the bright light mode, and the gain index value obtained at that time is equal to the preset gain index value, then the imaging device 30 keeps working in the bright light mode. If the working mode of the imaging device 30 at a certain time is the dark light mode, and the gain index value obtained at that time is equal to the preset gain index value, then the imaging device 30 keeps working in the dark light mode. Thereby, the problem of high energy consumption caused by frequent switching of the working mode of the imaging device 30 is avoided.

Figure 7:
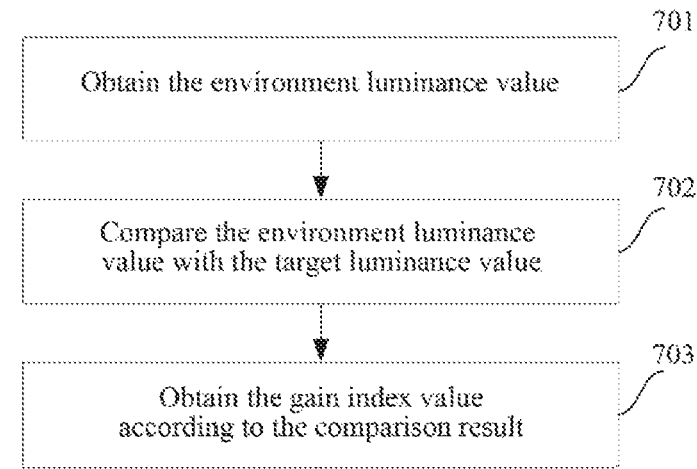
FIG. 7 is a flowchart of a third example of an imaging control method in an implementation of the present disclosure.
Figure 8:
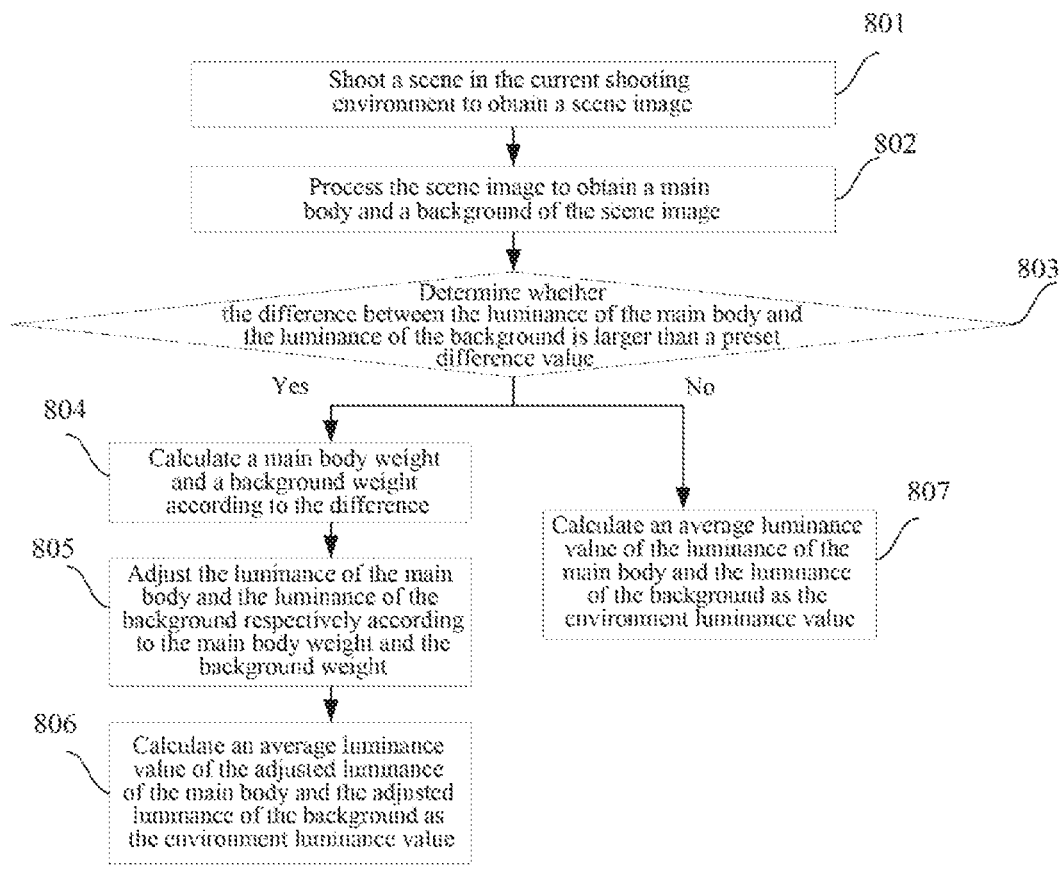
FIG. 8 is a flowchart of a fourth example of an imaging control method in an implementation of the present disclosure.

Referring to FIGS. 7 and 8, in some implementations, the action 201 of obtaining the gain index value according to the environment luminance value of the current shooting environment and the preset target luminance value may include the following actions 701-703.

In action 701, the environment luminance value is obtained.

In action 702, the environment luminance value is compared with the target luminance value.

In action 703, the gain index value is obtained according to the comparison result.

In an exemplary example, the environment luminance value may be calculated using an Automatic Exposure (AE) algorithm, and the corresponding action 701 may include the following actions 801-807.

In action 801, a scene in the current shooting environment is shot to obtain a scene image.

In action 802, the scene image is processed to obtain a main body and a background of the scene image.

In action 803, it is determined whether the difference between the luminance of the main body and the luminance of the background of the scene image is larger than a preset difference value.

In action 804, when the difference between the luminance of the main body and the luminance of the background is larger than the preset difference value, a main body weight and a background weight are calculated according to the difference.

In action 805, the luminance of the main body and the luminance of the background are adjusted respectively according to the main body weight and the background weight.

In action 806, an average luminance value of the adjusted luminance of the main body and the adjusted luminance of the background is calculated as the environment luminance value.

In action 807, when the difference between the luminance of the main body and the luminance of the background is less than or equal to the preset difference value, an average luminance value of the luminance of the main body and the luminance of the background is calculated as the environment luminance value.

Figure 9:
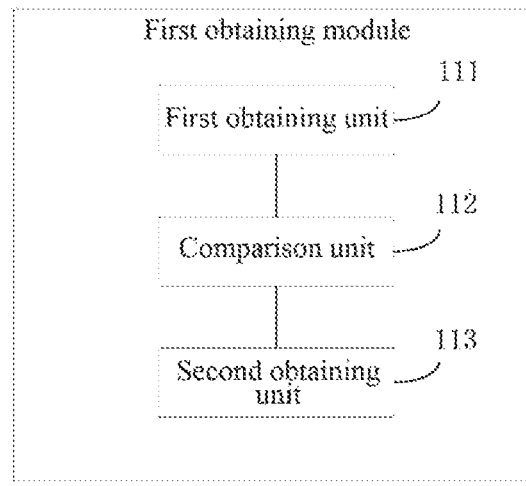
FIG. 9 is a block diagram of a first obtaining module of a control device in an implementation of the present disclosure.
Figure 10:
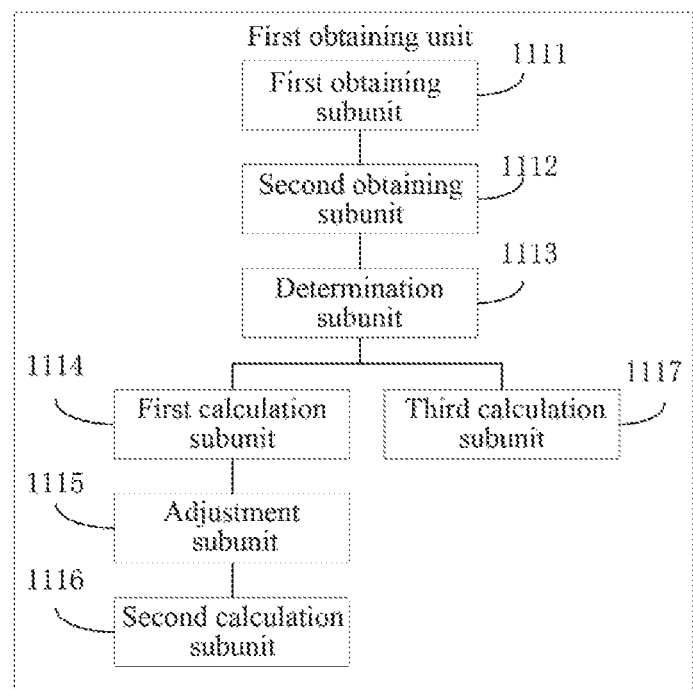
FIG. 10 is a block diagram of a first obtaining unit of a control device in an implementation of the present disclosure.

Referring to FIGS. 9 and 10, in some implementations, the first obtaining module 11 may include a first obtaining unit 111, a comparison unit 112, and a second obtaining unit 113. The first obtaining unit 111 may include a first obtaining subunit 1111, a second obtaining subunit 1112, a determination subunit 1113, a first calculation subunit 1114, an adjustment subunit 1115, a second calculation subunit 1116, and a third calculation subunit 1117. Action 701 may be implemented by the first obtaining unit 111. Action 702 may be implemented by the comparison unit 112. Action 703 may be implemented by the second obtaining unit 113. Action 801 may be implemented by the first obtaining subunit 1111. Action 802 may be implemented by the second obtaining subunit 1112. Action 803 may be implemented by the determination subunit 1113. Action 804 may be implemented by the first calculation subunit 1114. Action 805 may be implemented by the adjustment subunit 1115. Action 806 may be implemented by the second calculation subunit 1116. Action 807 may be implemented by the third calculation subunit 1117.

In an exemplary implementation, the first obtaining unit 111 may be configured to obtain an environment luminance value. The comparison unit 112 may be configured to compare the environment luminance value with the target luminance value. The second obtaining unit 113 may be configured to obtain the gain index value according to the comparison result. The first obtaining subunit 1111 may be configured to shoot a scene under the current environment to obtain a scene image. The second obtaining subunit 1112 may be configured to process the scene image to obtain the main body and background of the scene image. The determination subunit 1113 may be configured to determine whether the difference between the luminance of the main body and the luminance of the background of the scene image is larger than the preset difference value. The first calculation subunit 1114 may be configured to calculate the main body weight and the background weight according to the difference when the difference between the luminance of the main body and the luminance of the background is larger than the preset difference value. The adjustment subunit 1115 may be configured to adjust the luminance of the main body and the luminance of the background respectively according to the main body weight and the background weight. The second calculation subunit 1116 may be configured to calculate the average luminance value of the adjusted luminance of the main body and the adjusted luminance of the background as the environment luminance value. The third calculation subunit 1117 may be configured to calculate the average luminance value of the luminance of the main body and the luminance of the background as the environment luminance value when the difference between the luminance of the main body and the luminance of the background is less than or equal to the preset difference value.

Referring to FIG. 6, in some implementations, the processor 60 in the imaging device 30 may also be configured to obtain an environment luminance value, compare the environment luminance value with the target luminance value, and obtain a gain index value based on the comparison result. The processor 60 is further configured to shoot a scene under the current environment to obtain a scene image; process the scene image to obtain a main body and a background of the scene image; determine whether the difference between the luminance of the main body and the luminance of the background of the scene image is larger than a preset difference value; when the difference between the luminance of the main body and the luminance of the background is larger than the preset difference value, calculate a main body weight and a background weight according to the difference; respectively adjust the luminance of the main body and the luminance of the background according to the main body weight and the background weight; calculate an average luminance value of the adjusted luminance of the main body and the adjusted luminance of the background as the environment luminance value; and when the difference between the luminance of the main body and the luminance of the background is less than or equal to the preset difference value, calculate an average luminance value of the luminance of the main body and the luminance of the background as the environment luminance value.

Figure 11:
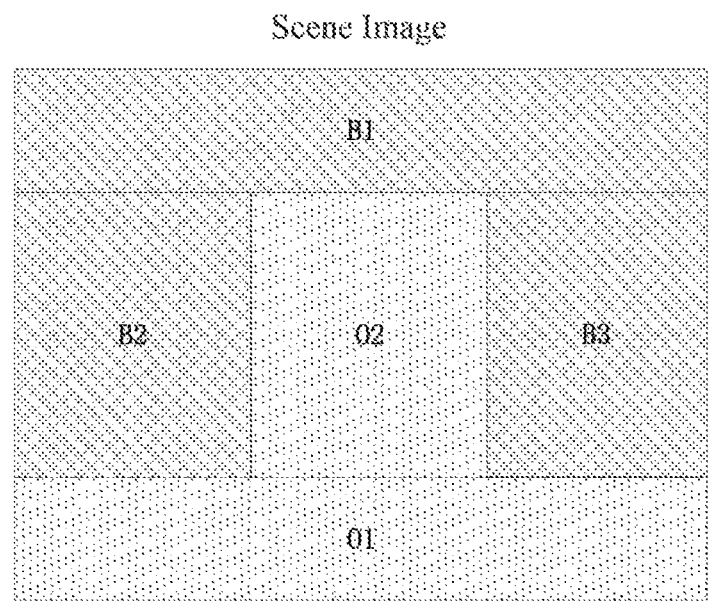
FIG. 11 is a schematic diagram of a scene image in an imaging control method in an implementation of the present disclosure.

In an exemplary example, referring to FIG. 11, the processor 60 first controls each photosensitive pixel 3111 to be exposed with the same exposure time to shoot a scene image. Then the processor 60 divides the main body and the background in the scene image. Generally, the main body is located in the middle or lower part of the scene image, while the background is located in the upper part of the scene image. Hence the processor 60 may directly divide the main body (O1 and O2) and the background (B1, B2 and B3) of the image in a manner as shown in FIG. 11. Alternatively, the processor 60 may divide the main body (O1 and O2) and the background (B1, B2 and B3) by face recognition. For example, the processor 60 may recognize whether there is a face in the scene image, and when there is a face in the scene image, the person is taken as the main body and the other part in the scene image is taken as the background. Subsequently, the processor 60 obtains the luminance of the main body and the luminance of the background respectively. Then the processor 60 calculates the difference between the luminance of the main body and the luminance of the background. For example, the processor 60 may first calculate an average luminance value LOave of the main body and an average luminance value LBave of the background, and use the average luminance value LOave of the main body and the average luminance value LBave of the background respectively as the luminance of the main body and the luminance of the background, wherein LOave=(LO1+LO2)/2, LBave=(LB1+LB2+LB3)/3, and then the average luminance value of the background is subtracted from the average luminance value of the main body to obtain the difference in luminance (LOave−LBave=D). Subsequently, the processor 60 compares the difference D with the preset difference value D0. When the difference value is larger than or equal to the preset difference value (D>D0), it indicates that the luminance difference between the main body and the background is large, and the scene at this time may be a backlight scene. Therefore, the processor 60 needs to assign, according to the luminance difference, a main body weight with a large value to the main body, and a background weight with a small value to the background, and use the main body weight to adjust the luminance of the main body to obtain an adjusted luminance of the main body LOadj, and use the background weight to adjust the luminance of the background to obtain an adjusted luminance of the background LBadj. Finally, the processor 60 calculates an average luminance value Lux (Lux=(LOadj+LBadj)/2) of the adjusted luminance LOadj of the main body and the adjusted luminance LBadj of the background, and the average luminance value Lux is the environment luminance value. If the difference value is less than the preset difference value (D<D0), it indicates that the luminance difference between the main body and the background is small, and the scene at this time may be a normal non-backlight scene. At this time, the processor 60 directly calculates an average luminance value Lave of the main body's luminance LOave and the background's luminance LBave, and uses the average luminance value Lave as the environment luminance value Lux. It can be understood that in a backlight environment, the luminance of the main body and the background are quite different, and generally the main body is the interested region to the user. Therefore, the main body part needs to be given more weight so that a proper environment luminance value can be provided for the processor 60 to select a working mode subsequently.

After determining the environment luminance value, the processor 60 compares the environment luminance value with the preset target luminance value to determine the gain index value. When the environment luminance value is less than the target luminance value, it indicates that a large gain value needs to be provided for the imaging device 30 at this time, and correspondingly, the gain index value is also large. When the environment luminance value is larger than the target luminance value, it indicates that the imaging device 30 needs to be provided with a small gain value at this time, and correspondingly, the gain index value is also small. In an exemplary implementation, the difference between the environment luminance value and the target luminance value, the gain value, and the gain index value have a one-to-one correspondence relationship and is pre-stored in an exposure table. After obtaining the environment luminance value, the imaging device 30 can find a gain index value matching with it in the exposure table according to the difference between the environment luminance value and the target luminance value.

Figure 12:
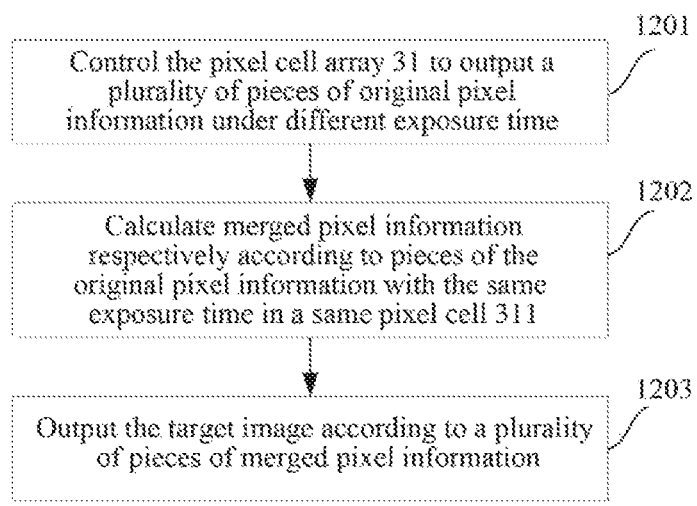
FIG. 12 is a flowchart of a fifth example of an imaging control method in an implementation of the present disclosure.

Referring to FIG. 12, in some implementations, shooting in the bright light mode may include the following actions 1201-1203.

In action 1201, the pixel cell array 31 is controlled to output a plurality of pieces of original pixel information under different exposure time.

In action 1202, merged pixel information is calculated respectively according to pieces of the original pixel information with the same exposure time in a same pixel cell 311.

In action 1203, the target image is output according to a plurality of pieces of merged pixel information.

Figures 13, 14:
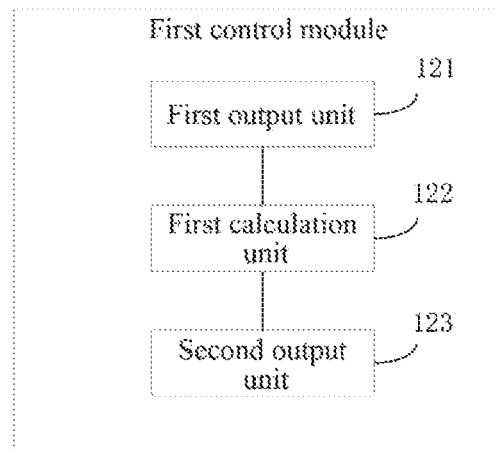
FIG. 13 is a block diagram of a first control module of a control device in an implementation of the present disclosure.
FIG. 14 is a schematic diagram of the structure of a pixel cell array of an imaging device in an implementation of the present disclosure.

Referring to FIG. 13, in some implementations, the first control module 12 may include a first output unit 121, a first calculation unit 122, and a second output unit 123. Action 1201 may be implemented by the first output unit 121. Action 1202 may be implemented by the first calculation unit 122. Action 1203 may be implemented by the second output unit 123. That is, the first output unit 121 may be configured to control the pixel cell array 31 to output a plurality of pieces of original pixel information under different exposure time. The first calculation unit 122 may be configured to calculate merged pixel information based on pieces of the original pixel information with the same exposure time in a same pixel cell 311. The second output unit 123 may be configured to output a target image based on a plurality of pieces of the merged pixel information.

Referring to FIG. 6, in some implementations, actions 1201, 1202, and 1203 may be implemented by the processor 60. In an exemplary implementation, the processor 60 may also be configured to control the pixel cell array 31 to output a plurality of pieces of original pixel information under different exposure time, calculate merged pixel information based on pieces of the original pixel information with the same exposure time in a same pixel cell 311, and output a target image based on a plurality of pieces of the merged pixel information.

In an exemplary implementation, referring to FIG. 14, each pixel cell 311 in the pixel cell array 31 may include four photosensitive pixels 3111 arranged in a 2*2 array. For example, the four photosensitive pixels 3111 of each pixel cell 311 are one long exposure pixel, two medium exposure pixels, and one short exposure pixel. Of course, in other implementations, the numbers of long exposure pixels, medium exposure pixels, and short exposure pixels in each pixel cell 311 may be other values. The long exposure pixel refers to a photosensitive pixel 3111 corresponding to long exposure time, the medium exposure pixel refers to a photosensitive pixel 3111 corresponding to medium exposure time, and the short exposure pixel refers to a photosensitive pixel 3111 corresponding to short exposure time, wherein the long exposure time>medium exposure time>short exposure time, and the long exposure time/medium exposure time=medium exposure time/short exposure time. When the imaging device 30 works, the long exposure pixel, the medium exposure pixel, and the short exposure pixel are synchronously exposed, which means that the exposure durations of the medium exposure pixel and the short exposure pixel are within the exposure duration of the long exposure pixel. For example, as shown in FIG. 14, among the red photosensitive pixels 3111 in the pixel cell array 31, R(1,1) is a long exposure pixel, R(1,2) and R(2,1) are medium exposure pixels, and R(2,2) is a short exposure pixel, and the exposure process of the photosensitive pixels 3111 may be: the long exposure pixel R(1,1) begins to be exposed firstly, and then the medium exposure pixel R(1,2), the medium exposure pixel R(2,1) and the short exposure pixel R(2,2) are exposed during the exposure duration of the long exposure pixel R(1,1). The exposure start time of the medium exposure pixel R(1,2) and the medium exposure pixel R(2,1) is the same, and the exposure end time of the medium exposure pixel R(1,2), the medium exposure pixel R(2,1) and the short exposure pixel R(2,2) is the same as that of the long exposure pixel R(1,1) or before the exposure end time of the long exposure pixel R(1,1). Alternatively, the long exposure pixel R(1,1), the medium exposure pixel R(1,2), the medium exposure pixel R(2,1), and the short exposure pixel R(2,2) begin to be exposed at the same time, that is, the exposure start time of the long exposure pixel R(1,1), the medium exposure pixel R(1,2), the medium exposure pixel R(2,1), and the short exposure pixel R(2,2) is the same. As such, the processor 60 need not to control the pixel cell array 31 to sequentially perform long exposure, medium exposure, and short exposure, so that the shooting time of the target image can be reduced.

When the imaging device 30 works in the bright light mode, the imaging device 30 may firstly control the long exposure pixels, the medium exposure pixels, and the short exposure pixels in each pixel cell 311 to be exposed synchronously, wherein the exposure time corresponding to the long exposure pixels is initial long exposure time, the exposure time corresponding to the medium exposure pixels is initial medium exposure time, the exposure time corresponding to the short exposure pixels is initial short exposure time, and the initial long exposure time, the initial medium exposure time, and the initial short exposure time are all set in advance. After the exposure, each pixel cell will output four pieces of original pixel information. Taking the pixel cell 311 shown in FIG. 14 as an example, the four pieces of original pixel information may include the original pixel information output by the long exposure pixel R(1,1), the original pixel information output by the medium exposure pixel R(1,2), the original pixel information output by the medium exposure pixel R(2,1), and the original pixel information output by the short exposure pixel R(2,2). The processor 60 controls the photosensitive pixels 3111 in each pixel cell to synchronously perform long, medium, and short-time exposures in a manner as described above, and obtains a plurality of pieces of original pixel information output by each pixel cell. Subsequently, the processor 60 calculates merged pixel information based on pieces of the original pixel information with the same exposure time in the same pixel cell. Taking the pixel cell 311 shown in FIG. 14 as an example, if the number of photosensitive pixels 3111 in the pixel cell 311 is 2×2, the original pixel information of the long exposure pixel R(1,1) is the merged pixel information of long exposure, and the sum of the original pixel information of the medium exposure pixel R(1,2) and the original pixel information of the medium exposure pixel R(2,1) is the merged pixel information of medium exposure, and the original pixel information of the short exposure pixel R(2, 2) is the merged pixel information of short exposure. If the number of photosensitive pixels 3111 in the pixel cell 311 is 2×4, the number of long exposure pixels is 2, the number of medium exposure pixels is 4, and the number of short exposure pixels is 2, the sum of the original pixel information of the two long exposure pixels is the merged pixel information of long exposure, the sum of the original pixel information of the four medium exposure pixels is the merged pixel information of medium exposure, and the sum of the original pixel information of the two short exposure pixels is the merged pixel information of short exposure. In this way, the processor 60 can obtain a plurality of pieces of merged pixel information of long exposure, a plurality of pieces of merged pixel information of medium exposure, and a plurality of pieces of merged pixel information of short exposure of the entire pixel cell array 31. The processor 60 then performs interpolation calculation to obtain a long exposure subimage according to the plurality of pieces of merged pixel information of long exposure, performs interpolation calculation to obtain a medium exposure subimage according to the plurality of pieces of merged pixel information of medium exposure, and performs interpolation calculation to obtain a short exposure subimage according to the plurality of pieces of merged pixel information of short exposure. Finally, the processor 60 fuses the long exposure subimage, the medium exposure subimage and the short exposure subimage to obtain a target image with a high dynamic range. Herein, the long exposure subimage, the medium exposure subimage and the short exposure subimage are not three frames of an image, but are image portions formed by corresponding regions of long, short and medium exposure pixels in the same frame of the image.

Alternatively, after the exposure of the pixel cell array 31 is completed, the processor 60 may superimpose the original pixel information of the short exposure pixel and the original pixel information of the medium exposure pixel on the original pixel information of the long exposure pixel based on the original pixel information output by the long exposure pixel. In an exemplary implementation, the original pixel information of three different exposure time lengths can be respectively given different weights, and after the original pixel information corresponding to each exposure time length is multiplied by the weight, the three kinds of original pixel information multiplied by the weights can be added as composite pixel information of one pixel cell 311. Subsequently, since the gray scale of each piece of composite pixel information calculated from the original pixel information of three different exposure time lengths will change, each piece of the composite pixel information needs to be compressed at the gray scale after the composite pixel information is obtained. After the compression is completed, the processor 60 performs interpolation calculation based on a plurality of pieces of the composite pixel information obtained after the compression to obtain the target image. As such, the dark portion of the target image has been compensated by using the original pixel information output by the long exposure pixel, and the bright portion has been suppressed by using the original pixel information output by the short exposure pixel. Therefore, the target image does not have an over-exposed area or under-exposed area, and has a higher dynamic range and better imaging effect.

In an exemplary implementation, to further improve the imaging quality of the target image, after the long exposure pixel, the medium exposure pixel, and the short exposure pixel are synchronously exposed according to the initial long exposure time, the initial medium exposure time, and the initial short exposure time, respectively, the processor 60 first calculates a long exposure histogram based on the original pixel information output by the long exposure pixel, calculates a short exposure histogram based on the original pixel information output by the short exposure pixel, adjusts the initial long exposure time based on the long exposure histogram to obtain an adjusted long exposure time, and adjusts the initial short exposure time based on the short exposure histogram to obtain an adjusted short exposure time. Subsequently, the processor 60 controls the long exposure pixel, the medium exposure pixel, and the short exposure pixel to be synchronously exposed according to the adjusted long exposure time, the initial medium exposure time, and the corrected short exposure time, respectively. The adjustment is not performed once only, but the imaging device 30 carries out multiple long, medium, and short synchronous exposures. After each synchronous exposure, the imaging device 30 will continue to adjust the long exposure time and short exposure time according to the generated long exposure histogram and short exposure histogram, and will use the adjusted long exposure time, the adjusted short exposure time, and the original medium exposure time to carry out synchronous exposure in the next exposure, and continue to obtain the long exposure histogram and the short exposure histogram, and repeat this process until there is no under-exposed area in the image corresponding to the long exposure histogram and no over-exposed area in the image corresponding to the short exposure histogram, and the adjusted long exposure time and the adjusted short exposure time at this time are the final adjusted long exposure time and adjusted short exposure time. After the exposure, the target image is calculated based on the outputs of the long exposure pixel, the medium exposure pixel, and the short exposure pixel. The calculation method is the same as that in the previous implementation, and will not be repeated here.

The long exposure histogram may be one or more. When there is one long exposure histogram, the processor 60 generates a long exposure histogram based on the original pixel information output by all long exposure pixels. When there are multiple long exposure histograms, the processor 60 divides the long exposure pixels into regions and generates a long exposure histogram based on the original pixel information of the plurality of long exposure pixels in each region, so that the plurality of regions correspond to the plurality of long exposure histograms. By the region division, the accuracy of the long exposure time adjusted each time may be improved, and the adjustment process of the long exposure time may be speeded up. Likewise, the short exposure histogram may be one or more. When there is one short exposure histogram, the processor 60 generates a short exposure histogram based on the original pixel information output by all short exposure pixels. When there are multiple short exposure histograms, the processor 60 divides the short exposure pixels into regions and generates a short exposure histogram based on the original pixel information of the plurality of short exposure pixels in each region, so that the plurality of regions correspond to the plurality of short exposure histograms. By the region division, the accuracy of the short exposure time adjusted each time may be improved and the adjustment process of the short exposure time may be speeded up.

Figure 15:
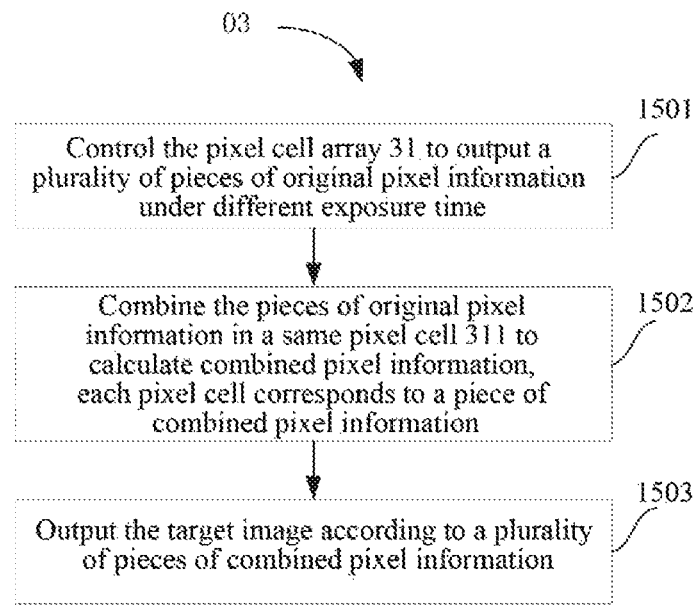
FIG. 15 is a flowchart of a sixth example of an imaging control method in an implementation of the present disclosure.

Referring to FIG. 15, in some implementations, shooting in dark mode may include the following actions 1501-1503.

In action 1501, the pixel cell array 31 is controlled to output a plurality of pieces of original pixel information under different exposure time.

In action 1502, the pieces of original pixel information in a same pixel cell 311 are combined to calculate combined pixel information, each pixel cell corresponding to a piece of combined pixel information.

In action 1503, the target image is output according to a plurality of pieces of the combined pixel information.

Figure 16:
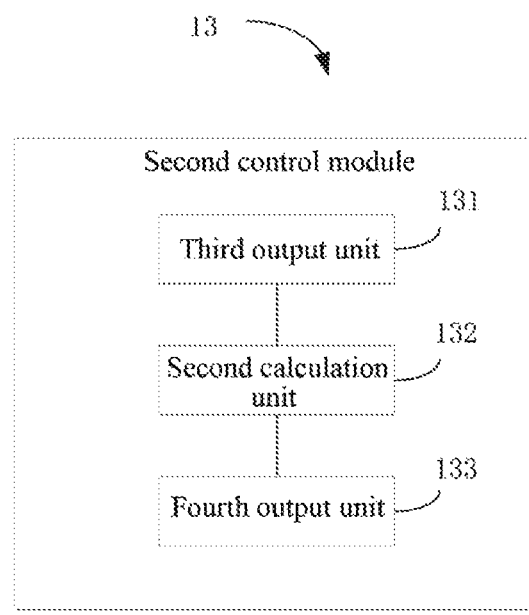
FIG. 16 is a block diagram of a second control module of a control device in an implementation of the present disclosure.

Referring to FIG. 16, in some implementations, the second control module 13 may include a third output unit 131, a second calculation unit 132, and a fourth output unit 133. Action 1501 may be implemented by the third output unit 131. Action 1502 may be implemented by the second calculation unit 132. Action 1503 may be implemented by the fourth output unit 133. That is, the third output unit 131 may be configured to control the pixel cell array 31 to output a plurality of pieces of original pixel information under different exposure time. The second calculation unit 132 may be configured to calculate combined pixel information by combining the original pixel information in a same pixel cell 311, and each pixel cell 311 corresponds to a piece of combined pixel information. The fourth output unit 133 may be configured to output a target image based on a plurality of pieces of the combined pixel information.

Referring to FIG. 6, in some implementations, actions 1501, 1502, and 1503 may all be implemented by processor 60. In an exemplary implementation, the processor 60 may also be configured to control the pixel cell array 31 to output a plurality of pieces of original pixel information under different exposure time, to combine the pieces of original pixel information in a same pixel cell 311 to calculate combined pixel information, each pixel cell 311 corresponding to a piece of combined pixel information, and to output a target image based on a plurality of pieces of the combined pixel information.

Figure 17:
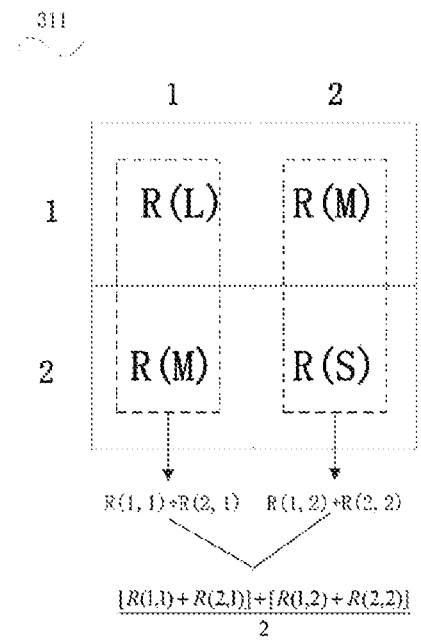
FIG. 17 is a schematic diagram of a principle of an imaging control method in an implementation of the present disclosure.

In an exemplary implementation, in the dark light mode, taking the pixel cell 311 shown in FIG. 17 as an example, R(1,1) is a long exposure pixel, R(1,2) and R(2,1) are medium exposure pixels, and R(2,2) is a short exposure pixel. The processor 60 firstly controls the long exposure pixel R(1,1), the medium exposure pixel R(1,2), the medium exposure pixel R(2,1) and the short exposure pixel R(2,2) to be synchronously exposed. After the exposure is finished, the pixel cell 311 will output four pieces of original pixel information, namely, the original pixel information output by the long exposure pixel R(1,1), the original pixel information output by the medium exposure pixel R(1,2), the original pixel information output by the medium exposure pixel R(2,1), and the original pixel information output by the short exposure pixel R(2,2). As such, the processor 60 controls the photosensitive pixels 3111 in each pixel cell 311 to simultaneously perform long, medium, and short-time exposures in a manner as described above, and obtains a plurality of pieces of original pixel information output by each pixel cell 311. Subsequently, the processor 60 may combine the pieces of original pixel information in a same pixel cell 311 to calculate combined pixel information. For example, the combined pixel information of each pixel cell 311 may be calculated by using the formula:

$$\frac{[R(1, 1) + R(2, 1)] + [R(1, 2) + R(2, 2)]}{2}.$$

As such, the processor 60 can calculate a plurality of pieces of combined pixel information of the plurality of pixel cells 311 in the entire pixel cell array 31. Finally, the processor 60 performs interpolation and calculates the target image based on the plurality of pieces of combined pixel information.

It can be understood that in the bright light mode, the original pixel information of three different exposure time lengths output by the pixel cell array 31 is used to obtain the target image. As the target image is obtained by combining pixel information of long, medium and short exposure time, the target image obtained in the bright light mode may have a high dynamic range. However, the bright light mode may be only suitable for scenes with high environment luminance. When the environment luminance is high, the medium exposure pixel may be exposed normally, the long exposure pixel may adjust the under-exposed portion in the medium exposure image, and the short exposure pixel may adjust the over-exposed portion in the medium exposure image, thus obtaining the target image with high dynamic range. However, if the bright light mode is used in photographing when the current environment luminance value is low, neither the long exposure pixel nor the medium exposure pixel can get enough exposure, and the target image shot in the bright light mode has much noise and poor contrast and definition. In the dark light mode, multiple pieces of original pixel information in a same pixel cell 311 is combined. When the environment luminance is low, using the dark light mode to obtain the target image will reduce the resolution of the target image, but the pixel information of each pixel in the target image is obtained by combining the original pixel information of multiple photosensitive pixels 3111. Compared with the bright light mode, the luminance of the target image obtained in the dark light mode is the double of the luminance of the target image obtained in the bright light mode. Therefore, the effect of the target image obtained by using the dark light mode is better when the environment luminance is low.

Therefore, with the imaging control method, the control device 10, and the imaging device 30 of implementations of the present disclosure, the luminance situation of the current environment is determined according to the gain index value, and the target image with less noise and higher luminance is shot in the dark light mode when the luminance of the current environment is low, and the target image with higher dynamic range is shot in the bright light mode when the luminance of the current environment is high. Thus, the target images obtained under different environment luminance have a good imaging effect.

Figure 18:
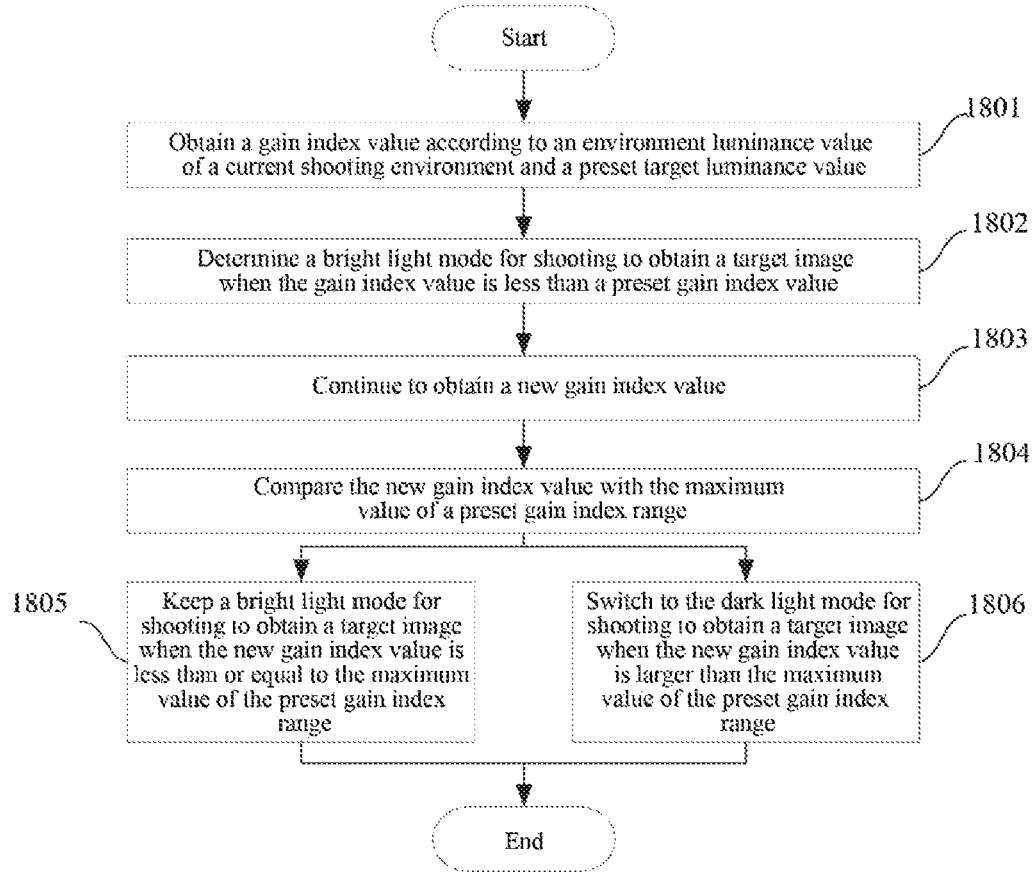
FIG. 18 is a flowchart of a seventh example of an imaging control method in an implementation of the present disclosure.

Referring to FIG. 18, in some implementations, an imaging control method may include the following actions 1801-1806

In action 1801, a gain index value is obtained according to an environment luminance value of a current shooting environment and a preset target luminance value. In action 1802, when the gain index value is less than a preset gain index value, a bright light mode is determined for shooting to obtain a target image.

In action 1803, a new gain index value (i.e., the aforementioned second gain index value) is continued to be obtained.

In action 1804, the new gain index value is compared with the maximum value of a preset gain index range (i.e., the upper limit value of the preset gain index range), wherein the preset gain index value is within the preset gain index range.

In action 1805, when the new gain index value is less than or equal to the maximum value of the preset gain index range, a bright light mode is kept for shooting to obtain a target image.

In action 1806, when the new gain index value is larger than the maximum value of the preset gain index range, the dark light mode is switched to for shooting to obtain a target image.

Figure 19:
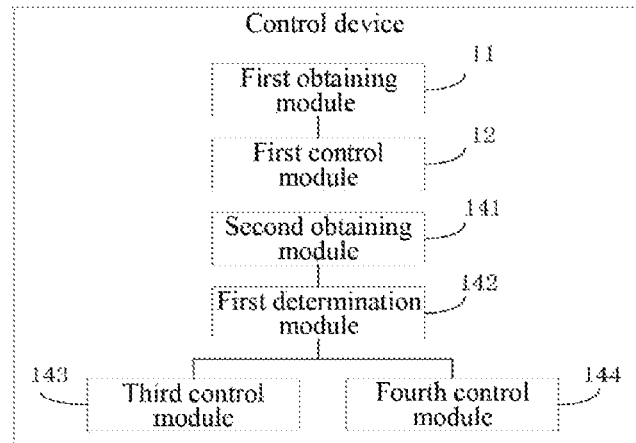
FIG. 19 is a block diagram of a first example of a control device in an implementation of the present disclosure.

Referring to FIG. 19, in some implementations, the control device 10 may further include a second obtaining module 141, a first determination module 142, a third control module 143, and a fourth control module 144. Action 1803 may be implemented by the second obtaining module 141. Action 1804 may be implemented by the first determination module 142. Action 1805 may be implemented by the third control module 143. Action 1806 may be implemented by the fourth control module 144. That is, the second obtaining module 141 may be configured to continue to obtain a new gain index value. The first determination module 142 may be configured to compare the new gain index value with the maximum value of a preset gain index range, and the preset gain index value is within the preset gain index range. The third control module 143 may be configured to continue to shoot in the bright light mode to obtain the target image when the new gain index value is less than or equal to the maximum value of the preset gain index range. The fourth control module 144 may be configured to switch to the dark light mode for shooting to obtain the target image when the new gain index value is larger than the maximum value of the preset gain index range.

Referring to FIG. 6, in some implementations, actions 1803, 1804, 1805, and 1806 may also be implemented by processor 60. In an exemplary implementation, the processor 60 may also be configured to: continue to obtain a new gain index value (i.e., the aforementioned second gain index value above); compare the new gain index value with the maximum value of a preset gain index range, wherein the preset gain index value is within the preset gain index range; when the new gain index value is less than or equal to the maximum value of the preset gain index range, continue to shoot in the bright light mode to obtain the target image; and when the new gain index value is larger than the maximum value of the preset gain index range, switch to the dark light mode for shooting to obtain the target image.

In an exemplary implementation, the preset gain index range is [400,520]. As mentioned before, the preset gain index value is 460, which is within the preset gain index range.

In an exemplary implementation, when the imaging device 30 is started up, the imaging device 30 firstly works in the bright light mode. Subsequently, the imaging device 30 obtains a gain index value corresponding to the current time environment. Assuming that the obtained gain index value g is 450, the imaging device 30 continues to shoot a target image in the bright light mode. Subsequently, the imaging device 30 continues to obtain gain index values corresponding to the environment at multiple time points, and compares the gain index value g obtained each time with the maximum value 520 of the preset gain index range of [400,520]. If the comparison result is g≤520, the imaging device 30 continues to work in the bright light mode. If the comparison result is g>520, the imaging device 30 switches to the dark light mode to work.

It can be understood that the luminance of the environment is usually in dynamic change, and the gain index value obtained at a previous time point is usually not equal to the gain index value obtained at a later time point. When the environment luminance continuously changes, a current gain index value g obtained will also fluctuate continuously in a small range around the preset gain index value (the value of |g−460| is less than a certain value). If the imaging device 30 continuously switches the working mode frequently according to the comparison between g and the preset gain index value (460), the power consumption of the imaging device 30 may be increased, and as the luminance change is not very much at this time, frequent switch of the working mode will not greatly improve the imaging effect of the target image. Therefore, in the imaging control method of the implementation of the present disclosure, a preset gain index range is set, and the working mode of the imaging device 30 is switched from the bright light mode to the dark light mode only when the gain index value g is greater than the maximum value 520 of the preset gain index range. As such, the problem of increasing the power consumption of the imaging device 30 due to frequent switching of the working mode is avoided, and the dark light mode is switched to timely when the environment luminance becomes low, thus ensuring the imaging quality of the target image.

Figure 20:
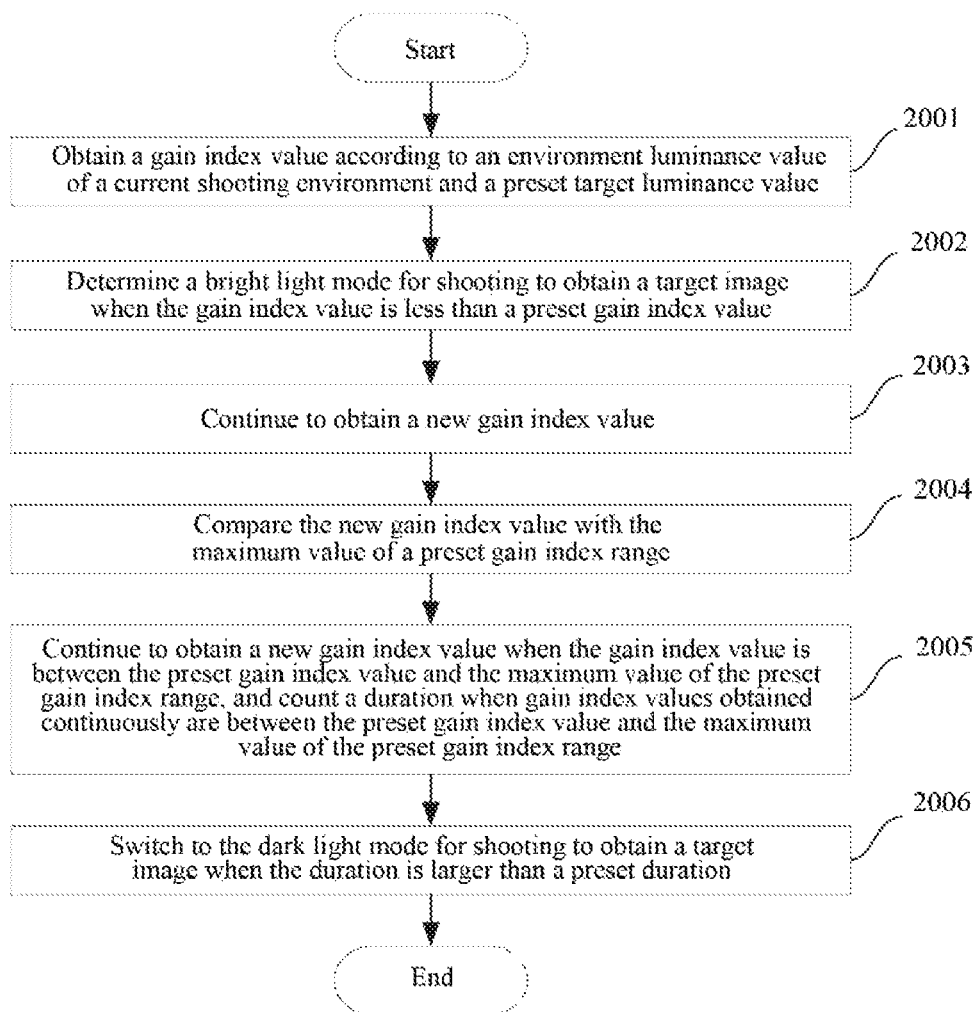
FIG. 20 is a flowchart of an eighth example of an imaging control method in an implementation of the present disclosure.

Further, referring to FIG. 20, in some implementations, an imaging control method may include the following actions 2001-2006.

In action 2001, a gain index value is obtained according to an environment luminance value of a current shooting environment and a preset target luminance value. In action 2002, when the gain index value is less than a preset gain index value, a bright light mode is determined for shooting to obtain a target image.

In action 2003, a new gain index value is continued to be obtained.

In action 2004, the new gain index value is compared with the maximum value of a preset gain index range, wherein the preset gain index value is within the preset gain index range.

In action 2005, when the gain index value is between the preset gain index value and the maximum value of the preset gain index range, a new gain index value (i.e., the aforementioned third gain index value) is continued to be obtained, and a duration when gain index values obtained continuously are between the preset gain index value and the maximum value of the preset gain index range is counted.

In action 2006, when the duration is larger than a preset duration, the dark light mode is switched to for shooting to obtain a target image.

Figure 21:
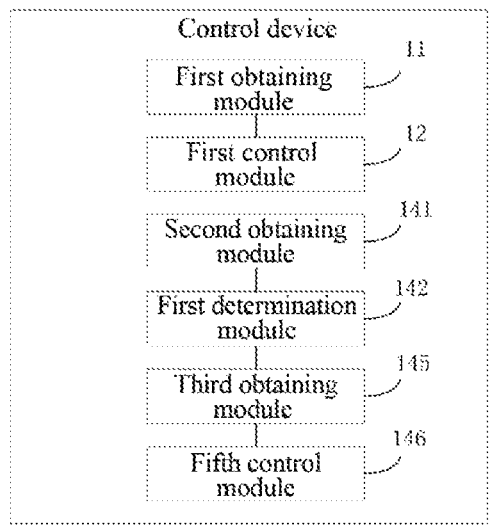
FIG. 21 is a block diagram of a second example of a control device in an implementation of the present disclosure.

Referring to FIG. 21, in some implementations, the control device 10 may further include a third obtaining module 145 and a fifth control module 146. Action 2005 may be implemented by the third obtaining module 145. Action 2006 may be implemented by the fifth control module 146. That is, the third obtaining module 145 may be configured to continue to obtain a new gain index value when the gain index value is between the preset gain index value and the maximum value of the preset gain index range, and to count the duration when gain index values obtained continuously are between the preset gain index value and the maximum value of the preset gain index range. The fifth control module 146 may be configured to switch to the dark light mode for shooting to obtain the target image when the duration is larger than a preset duration.

Referring to FIG. 6, in some implementations, actions 2005 and 2006 may also be implemented by processor 60. In an exemplary implementation, the processor 60 may also be configured to continue to obtain a new gain index value when the gain index value is between the preset gain index value and the maximum value of the preset gain index range, and to count the duration when gain index values obtained continuously are between the preset gain index value and the maximum value of the preset gain index range, and to switch to the dark light mode for shooting to obtain the target image when the duration is larger than a preset duration.

In an exemplary implementation, when the imaging device 30 is started up, the imaging device 30 firstly works in a bright light mode. Subsequently, the imaging device 30 obtains the gain index value corresponding to the current time environment. Assuming that the obtained gain index value g is 450, the imaging device 30 continues to shoot a target image in the bright light mode. Subsequently, the imaging device 30 obtains the gain index values corresponding to the environment at multiple time points, and compares the gain index value g obtained each time with the preset gain index range [400,520]. If the gain index value g obtained in the $n^{th}$ obtaining process satisfies 460<g≤520, the processor 60 controls a timer to start counting. If the gain index values g obtained in the $(n+1)^{th}$, $(n+2)^{th}$ . . . $(n+m)^{th}$ obtaining processes all satisfy 460<g≤520, and the total duration of the $n^{th}$ to $(n+m)^{th}$ obtaining processes is larger than a preset duration, the working mode of the imaging device 30 is switched to the dark light mode. If the gain index value g obtained once during the $n^{th}$ to $(n+m)^{th}$ obtaining processes does not satisfy 460<g≤520, for example, the obtained g>520, the timer will be cleared and the imaging device 30 will switch directly to the dark light mode. For another example, if the obtained g is less than or equal to 460, the timer will be cleared and the imaging device 30 will still keep working in the bright light mode.

As such, the working mode of the imaging device 30 is switched only when the duration when gain index values obtained continuously are between the preset gain index value and the maximum value of the preset gain index range is larger than a preset duration. On one hand, the problem of high power consumption caused by frequent switching of the working mode is avoided, and on the other hand, a suitable working mode is adopted timely according to change in environment luminance to shoot a target image of good quality.

Figure 22:
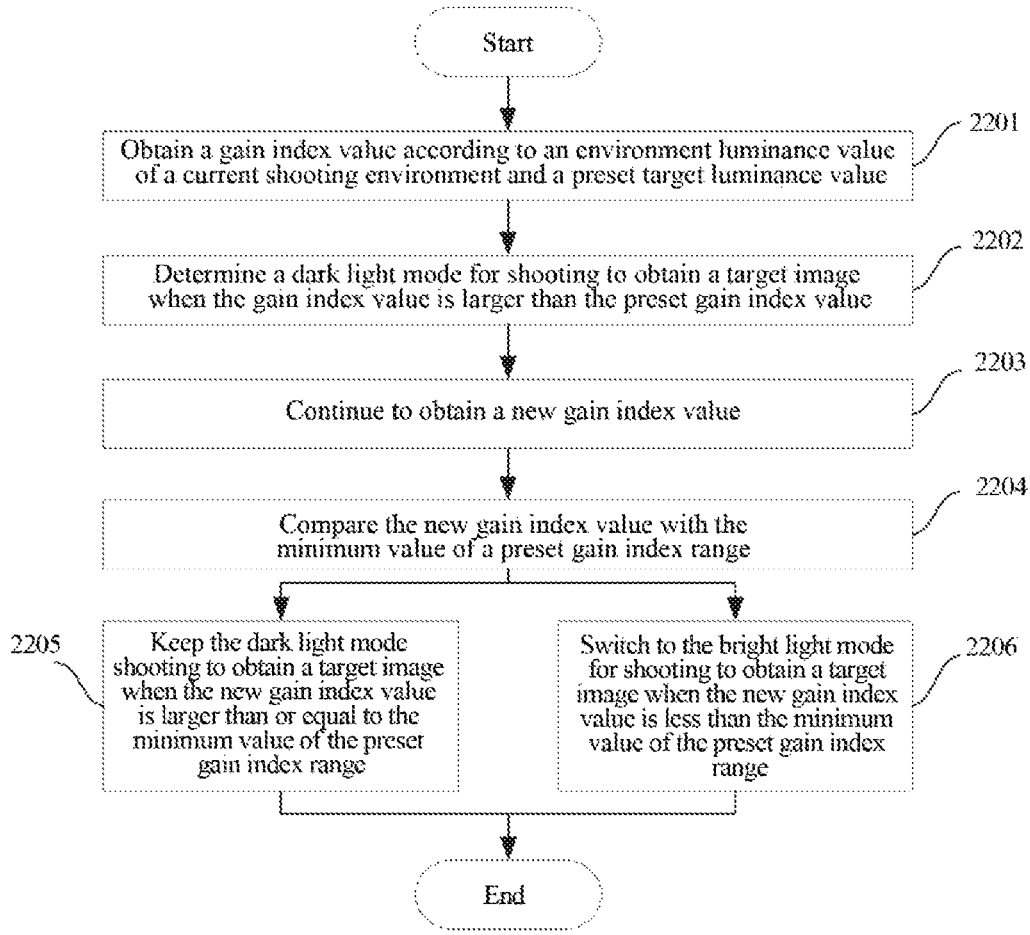
FIG. 22 is a flowchart of a ninth example of an imaging control method in an implementation of the present disclosure.

Referring to FIG. 22, in some implementations, an imaging control method may include the following actions 2201-2206.

In action 2201, a gain index value is obtained according to an environment luminance value of a current shooting environment and a preset target luminance value.

In action 2202, when the gain index value is larger than the preset gain index value, a dark light mode is determined for shooting to obtain a target image.

In action 2203, a new gain index value (i.e., the aforementioned second gain index value) is continued to be obtained.

In action 2204, the new gain index value is compared with the minimum value of a preset gain index range (i.e., the lower limit value of the preset gain index range), wherein the preset gain index value is within the preset gain index range.

In action 2205, when the new gain index value is larger than or equal to the minimum value of the preset gain index range, the dark light mode is kept for shooting to obtain a target image.

In action 2206, when the new gain index value is less than the minimum value of the preset gain index range, the bright light mode is switched to for shooting to obtain a target image.

Figure 23:
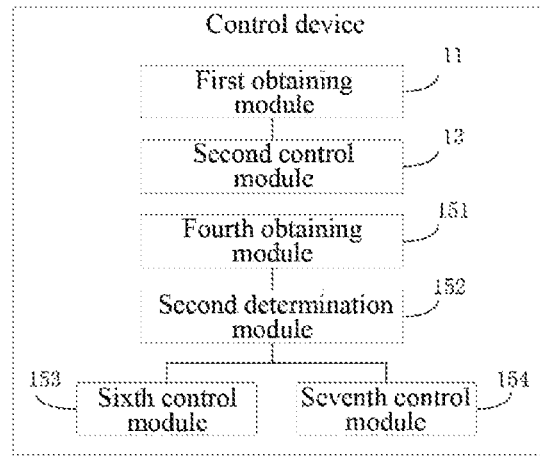
FIG. 23 is a block diagram of a third example of a control device in an implementation of the present disclosure.

Referring to FIG. 23, in some implementations, the control device 10 may further include a fourth obtaining module 151, a second determination module 152, a sixth control module 153, and a seventh control module 154. Action 2203 may be implemented by the fourth obtaining module 151. Action 2204 may be implemented by the second determination module 152. Action 2205 may be implemented by the sixth control module 153. Action 2206 may be implemented by the seventh control module 154. That is, the fourth obtaining module 151 may be configured to continue to obtain a new gain index value. The second determination module 152 may be configured to compare the new gain index value and the minimum value of the preset gain index range, and the preset gain index value is within the preset gain index range. The sixth control module 153 may be configured to continue to shoot in the dark light mode to obtain a target image when the new gain index value is larger than or equal to the minimum value of the preset gain index range. The seventh control module 154 may be configured to switch to the bright light mode for shooting to obtain a target image when the new gain index value is less than the minimum value of the preset gain index range.

Referring to FIG. 6, in some implementations, actions 2203, 2204, 2205, and 2206 may also be implemented by processor 60. In an exemplary implementation, the processor 60 may also be configured to: continue to obtain a new gain index value (i.e., the aforementioned second gain index value), and compare the new gain index value with the minimum value of the preset gain index range, wherein the preset gain index value is within the preset gain index range;

when the new gain index value is larger than or equal to the minimum value of the preset gain index range, continue to shoot in the dark light mode to obtain a target image; and when the new gain index value is less than the minimum value of the preset gain index range, switch to the bright light mode for shooting to obtain a target image.

In an exemplary implementation, when the imaging device 30 is started up, the imaging device 30 firstly works in a bright light mode. Subsequently, the imaging device 30 obtains the gain index value corresponding to the current time environment. Assuming that the obtained gain index value g is 540, the imaging device 30 switches to the dark light mode for shooting a target image. Subsequently, the imaging device 30 continues to obtain gain index values corresponding to the environment at multiple time points, and compares the gain index value g obtained each time with the minimum value 400 of the preset gain index range of [400,520]. If the comparison result is g≥400, the imaging device 30 continues to work in the dark light mode. If the comparison result is g<400, the imaging device 30 is switched to the bright light mode to work.

It can be understood that the luminance of the environment is usually in dynamic change, and the gain index value obtained at a previous time point is usually not equal to the gain index value obtained at a later time point. When the environment luminance continuously changes, the gain index value g will also fluctuate continuously in a small range around the preset gain index value (the value of |g−460| is less than a certain value). If the imaging device 30 continuously switches the working mode frequently according to the comparison between g and the preset gain index value (460), the power consumption of the imaging device 30 may be increased, and since the luminance change is not very much at this time, switching the working mode frequently does not greatly improve the imaging effect of the target image. Therefore, in the imaging control method of the implementation of the present disclosure, a preset gain index range is set, and the working mode of the imaging device 30 is switched from the dark light mode to the bright light mode only when the gain index value g is less than the minimum value 400 of the preset gain index range. As such, the problem of increasing the power consumption of the imaging device 30 due to frequent switching of the working mode is avoided, and when the environment luminance becomes bright, the bright light mode is switched to timely, thus ensuring the imaging quality of the target image.

Figure 24:
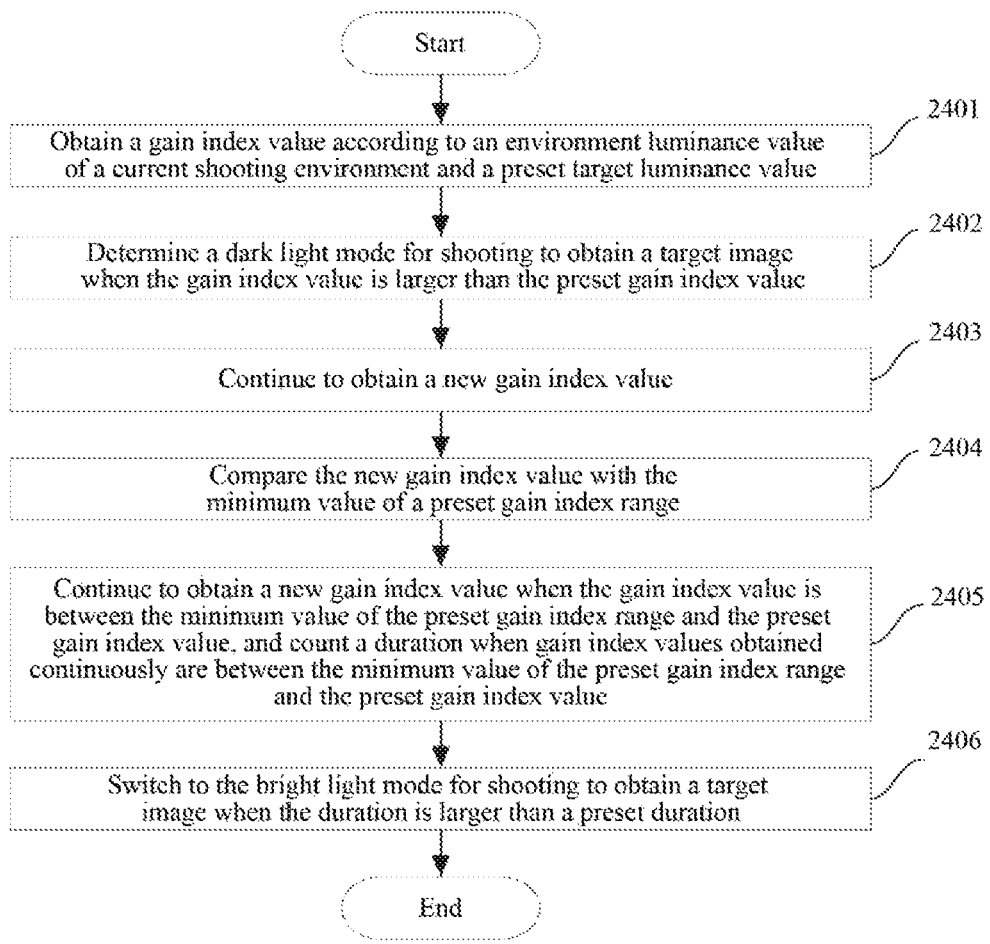
FIG. 24 is a flowchart of a tenth example of an imaging control method in an implementation of the present disclosure.

Referring to FIG. 24, in some implementations, an imaging control method may include the following actions 2401-2406.

In action 2401, a gain index value is obtained according to an environment luminance value of a current shooting environment and a preset target luminance value.

In action 2402, when the gain index value is larger than the preset gain index value, a dark light mode is determined for shooting to obtain a target image.

In action 2403, a new gain index value (i.e., the aforementioned second gain index value) is continued to be obtained.

In action 2404, the new gain index value is compared with the minimum value of a preset gain index range.

In action 2405, when the gain index value is between the minimum value of the preset gain index range and the preset gain index value, a new gain index value (i.e., the aforementioned third gain index value) is continued to be obtained, and a duration when gain index values obtained continuously are between the minimum value of the preset gain index range and the preset gain index value is counted.

In action 2406, when the duration is larger than a preset duration, the bright light mode is switched to for shooting to obtain a target image.

Figure 25:
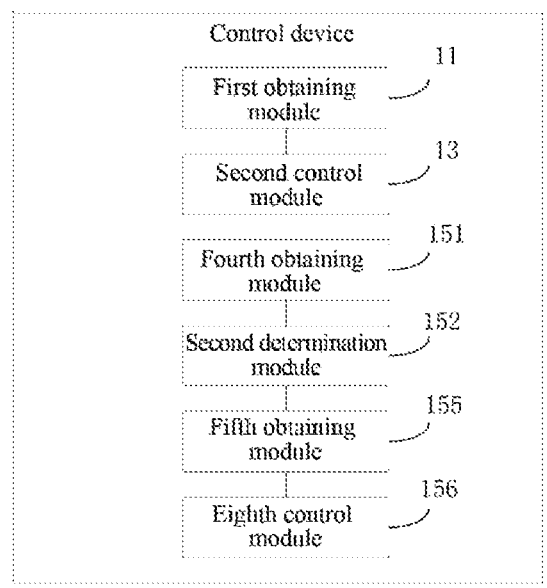
FIG. 25 is a block diagram of a fourth example of a control device in an implementation of the present disclosure.

Referring to FIG. 25, in some implementations, the control device 10 may further include a fifth obtaining module 155 and an eighth control module 156. Action 2405 may be implemented by the fifth obtaining module 155. Action 2406 may be implemented by the eighth control module 156. That is, the fifth obtaining module 155 may be configured to continue to obtain a new gain index value when the gain index value is between the minimum value of the preset gain index range and the preset gain index value, and to count the duration when gain index values obtained continuously are between the minimum value of the preset gain index range and the preset gain index value. The eighth control module 156 may be configured to switch to the bright light mode for shooting to obtain a target image when the duration is larger than a preset duration.

Referring to FIG. 6, in some implementations, actions 2405 and 2406 may also be implemented by processor 60. In an exemplary implementation, the processor 60 may also be configured to continue to obtain a new gain index value when the gain index value is between the minimum value of the preset gain index range and the preset gain index value, and to count the duration when gain index values obtained continuously are between the minimum value of the preset gain index range and the preset gain index value, and to switch to the bright light mode for shooting to obtain a target image when the duration is larger than the preset duration.

In an exemplary implementation, when the imaging device 30 is started up, the imaging device 30 firstly works in a bright light mode. Subsequently, the imaging device 30 obtains the gain index value corresponding to the current time environment. Assuming that the obtained gain index value g is 540, the imaging device 30 switches to the dark light mode to shoot a target image. Subsequently, the imaging device 30 obtains the gain index value corresponding to the environment at multiple time points, and compares the gain index value g obtained each time with the preset gain index range of [400,520]. If the gain index value g obtained in the $n^{th}$ obtaining process satisfies 400≤g≤460, the processor 60 controls the timer to start counting. If the gain index values g obtained during the $(n+1)^{th}$, $(n+2)^{th}$ ... $(n+m)^{th}$ obtaining processes all satisfy 400≤g≤460, and the total duration of the $n^{th}$ to $(n+m)^{th}$ obtaining processes is larger than a preset duration, the working mode of the imaging device 30 is switched to the bright light mode. If the gain index value g obtained once during the $n^{th}$ to $(n+m)^{th}$ obtaining processes does not satisfy 400≤g≤460, for example, the obtained g<400, the timer will be cleared and the imaging device 30 will switch directly to the bright light mode. For another example, if the measured g>460, the timer will be cleared and the imaging device 30 will still keep working in the dark light mode.

As such, the working mode of the imaging device 30 is switched only when the duration when gain index values obtained continuously are between the minimum value of the preset gain index range and the preset gain index value is larger than a preset duration. On one hand, the problem of high power consumption caused by frequent switching of the working mode is avoided, and on the other hand, an appropriate working mode is adopted timely according to change in environment luminance to shoot a target image with good quality.

In some implementations, when the output target image is a preview image, since long time exposure of long exposure pixels is performed both in the bright light mode and in the dark light mode, an output frame rate of the preview image will decrease. At this time, if the display frame rate of the imaging device 30 is larger than the output frame rate of the preview image, the output frame rate will not match the display frame rate, which may cause the display of the imaging device 30 to appear frozen or not smooth. To avoid such problems, the processor 60 may control the imaging device 30 to reduce the display frame rate so that the display frame rate matches the output frame rate. Alternatively, if the display frame rate is higher than the output frame rate, and at a time point the processor 60 has not yet generated a preview image of this time point for output and display, the processor 60 may output and display the preview image at a previous time point, that is, the preview image at the previous time point is used to fill the vacancy of the preview image that should be output at the current time point. As such, the problem that the display of the imaging device 30 is not smooth due to the mismatch between the display frame rate and the output frame rate is avoided, and the user experience is improved.

An implementation of the disclosure also provides a computer readable storage medium, which is one or more nonvolatile computer readable storage media contains computer executable instructions, which, when executed by one or more processors 60, cause the processor 60 to perform the imaging control method as described in any of the above implementations.

For example, when computer-executable instructions are executed by one or more processors 60, the processor 60 may be caused to perform the following actions 201-203.

In action 201, a gain index value (i.e., the aforementioned first gain index value) is obtained according to an environment luminance value of a current shooting environment and a preset target luminance value.

In action 202, when the gain index value is less than the preset gain index value, a bright light mode is determined for shooting to obtain a target image.

In action 203, when the gain index value is larger than the preset gain index value, a dark light mode is determined for shooting to obtain a target image.

For another example, when computer-executable instructions are executed by one or more processors 60, the processor 60 may be caused to perform the following actions 1201-1203.

In action 1201, a pixel cell array 31 is controlled to output a plurality of pieces of original pixel information under different exposure time.

In action 1202, merged pixel information is calculated respectively according to pieces of the original pixel information with the same exposure time in a same pixel cell 311.

In action 1203, a target image is output according to a plurality of pieces of merged pixel information.

Figure 27:
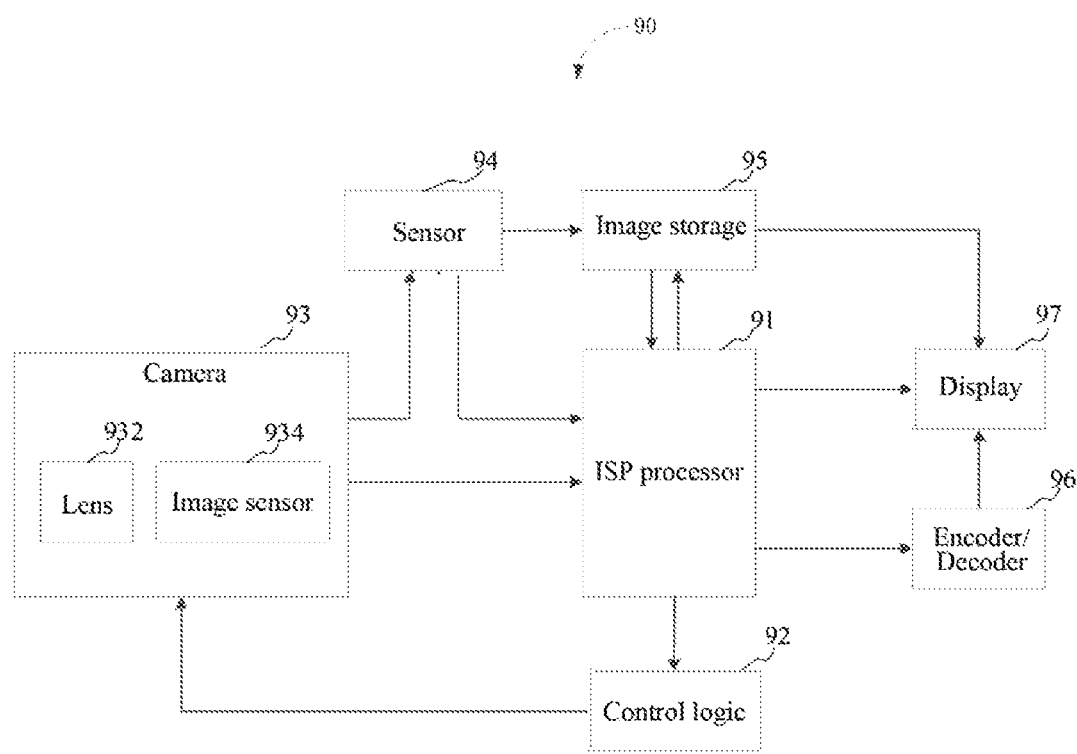
FIG. 27 is a block diagram of an image processing circuit in an implementation of the present disclosure.

Referring to FIG. 27, an implementation of the present disclosure also provides a computer device 200. The computer device 200 may include a storage 50 and a processor 60. The storage 50 stores computer readable instructions, and when executed by the processor 60, the computer readable instructions cause the processor 60 to execute the imaging control method as described in any of the above implementations.

Figure 26:
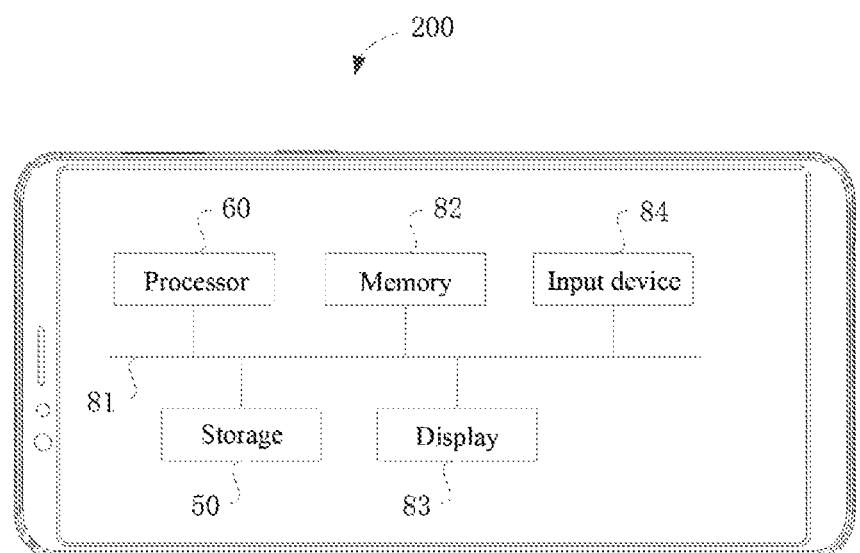
FIG. 26 is a block diagram of a computer device in an implementation of the present disclosure.

FIG. 26 is a schematic diagram of the internal structure of the computer device 200 according to an exemplary implementation. The computer device 200 may include a processor 60, a storage 50 (e.g., a non-volatile storage medium), a memory 82, a display 83, and an input device 84 connected via a system bus 81. The storage 50 of the computer device 200 stores an operating system and computer readable instructions. The computer readable instructions may be executed by the processor 60 to implement the imaging control method in an implementation of the present application. The processor 60 is used to provide computing and control capabilities to support the operation of the computer device 200. The storage 50 of the computer device 200 provides an environment for the execution of computer readable instructions in the memory 52. The display 83 of the computer device 200 may be a liquid crystal display screen or an electronic ink display screen, etc. The input device 84 may be a touch layer covering on the display 83, or may be keys, a trackball or touch pad provided on the housing of the computer device 200, or an external keyboard, touch pad or mouse, etc. The computer device 200 may be a mobile phone, a tablet computer, a notebook computer, a personal digital assistant or a wearable device (e.g., a smart bracelet, a smart watch, a smart helmet, smart glasses), etc. Those skilled in the art could understand that the structure shown in FIG. 26 is only a schematic diagram of a part of the structure related to a technical solution of the present application and does not constitute a limitation on the computer device to which the technical solution of the present application is applied. A specific computer device may include more or fewer components than those shown in the FIG. 26, or may combine some components, or may have different arrangement of components.

Referring to FIG. 27, the computer device 200 in an implementation of the present application may include an image processing circuit 90, which may be implemented by hardware and/or software components, including various processing units defining an Image Signal Processing (ISP) pipeline. FIG. 27 is a schematic diagram of an image processing circuit 90 in an exemplary implementation. As shown in FIG. 27, for ease of illustration, only those aspects of the image processing technology related to implementations of the present application are shown.

As shown in FIG. 27, the image processing circuit 90 may include an ISP processor 91 (the ISP processor 91 may be the processor 60) and a control logic 92. The image data captured by camera 93 is first processed by ISP processor 91, which analyzes the image data to capture image statistics that can be used to determine one or more control parameters of camera 93. The camera 93 may include one or more lenses 932 and an image sensor 934. The image sensor 934 may include an array of color filters (e.g., Bayer filters), and the image sensor 934 may obtain light intensity and wavelength information captured by each imaging pixel and provide a set of original image data that may be processed by the ISP processor 91. The sensor 94 (e.g., gyroscope) may provide the collected image processing parameters (e.g., anti-shake parameters) to the ISP processor 91 based on the interface type of the sensor 94. The interface of the sensor 94 may be a Standard Mobile Imaging Architecture (SMIA) interface, other serial or parallel camera interface, or a combination of the above.

In addition, the image sensor 934 may also send the original image data to the sensor 94, which may provide the original image data to the ISP processor 91 based on the interface type of the sensor 94, or the sensor 94 may store the original image data in the image storage 95.

ISP processor 91 processes the original image data pixel by pixel in various formats. For example, each image pixel may have a bit depth of 8, 10, 12, or 14 bits, and ISP processor 91 may perform one or more image processing operations on the original image data to collect statistical information about the image data. The image processing operation can be performed with the same or different bit depth accuracy.

ISP processor 91 may also receive image data from image storage 95. For example, the sensor 94 interface sends the original image data to the image storage 95, which in turn provides the original image data to the ISP processor 91 for processing. The image storage 95 may be a storage 50, a portion of the storage 50, a storage device, or a separate dedicated memory within an electronic device, and may include Direct Memory Access (DMA) features.

ISP processor 91 may perform one or more image processing operations, such as time domain filtering, when receiving raw image data from an image sensor 934 interface or from a sensor 94 interface or from image storage 95. The processed image data may be sent to the image storage 95 for further processing before being displayed. ISP processor 91 receives the processed data from image storage 95 and performs image data processing on the processed data in the original domain and RGB and YCbCr color spaces. The image data processed by ISP processor 91 may be output to display 97 (display 97 may include display 83) for viewing by a user and/or further processed by a graphics engine or Graphics Processing Unit (GPU). In addition, the output of ISP processor 91 may also be sent to image storage 95, and display 97 may read image data from image storage 95. In one implementation, the image storage 95 may be configured to include one or more frame buffers. In addition, the output of ISP processor 91 may be sent to encoder/decoder 96 to encode/decode image data. The encoded image data can be saved and decompressed before being displayed on the display 97 device. Encoder/decoder 96 may be implemented by a CPU or GPU or coprocessor.

The statistical data determined by ISP processor 91 may be sent to control logic 92 unit. For example, the statistical data may include image sensor 934 statistical information such as auto exposure, auto white balance, auto focus, flicker detection, black level compensation, lens 932 shadow correction, etc. Control logic 92 may include processing elements and/or microcontrollers that execute one or more routines (e.g., firmware), the one or more routines may determine control parameters of camera 93 and ISP processor 91 based on the received statistical data. For example, the control parameters of the camera 93 may include sensor 94 control parameters (e.g., gain, integration time of exposure control, anti-shake parameters, etc.), camera flash control parameters, lens 932 control parameters (e.g., focal length for focusing or zooming), or combinations of these parameters. ISP control parameters may include gain levels and color correction matrices for automatic white balance and color adjustment (e.g., during RGB processing), and lens 932 shading correction parameters.

For example, the processor 60 in FIG. 26 or the image processing circuit 90 (e.g., the ISP processor 91) in FIG. 27 may be used to implement the following actions 201-203 of an imaging control method.

In action 201, a gain index value (i.e., the aforementioned first gain index value) is obtained according to an environment luminance value of a current shooting environment and a preset target luminance value.

In action 202, when the gain index value is less than the preset gain index value, a bright light mode is determined for shooting to obtain a target image.

In action 203, when the gain index value is larger than the preset gain index value, a dark light mode is determined for shooting to obtain a target image.

For another example, the processor 60 in FIG. 26 or the image processing circuit 90 (e.g., the ISP processor 91) in FIG. 27 may be used to implement the following actions 1201-1203 of an imaging control method.

In action 1201, a pixel cell array 31 is controlled to output a plurality of pieces of original pixel information under different exposure time.

In action 1202, merged pixel information is calculated respectively according to pieces of the original pixel information with the same exposure time in a same pixel cell 311.

In action 1203, a target image is output according to a plurality of pieces of merged pixel information.

In the description of this specification, description made with reference to terms "an implementation," "some implementations," "examples," "specific examples," or "some examples" and the like means that a specific feature, structure, material, or characteristic described in connection with the implementation or example is included in at least one implementation or example of the present disclosure. In this specification, the schematic representations of the above terms are not necessarily directed to the same implementation or example. Furthermore, the specific features, structures, materials, or characteristics described may be combined in any one or more implementations or examples in a suitable manner. In addition, those skilled in the art may combine the different implementations or examples and the features of the different implementations or examples described in this specification without contradicting each other.

Furthermore, the terms "first", "second" and "third" are used only for descriptive purposes and cannot be understood as indicating or implying relative importance or implicitly indicating the number of indicated technical features. Thus, the features defined as "first", "second" and "third" may explicitly or implicitly include at least one of the features. In the description of the present disclosure, the meaning of "a plurality of" is at least two, such as two, three, etc., unless otherwise explicitly and specifically limited.

Any process or method description in the flowchart or otherwise described herein may be understood as representing a module, segment, or portion of codes including one or more executable instructions for implementing actions of a particular logical function or process, and the scope of implementations of the present disclosure includes other implementations. The functions may be performed in an order different from the order shown or discussed here, including in a substantially-simultaneous manner or in a reverse order according to the functions involved, which should be understood by those skilled in the art to which the implementations of the present disclosure belong.

The logic and/or actions represented in the flowchart or otherwise described herein, for example, may be considered as a sequencing table of executable instructions for implementing logical functions, and may be embodied in any computer readable medium for use by or in connection with an instruction execution system, apparatus, or device (e.g., a computer-based system, a system including a processor, or other system that can fetch and execute instructions from an instruction execution system, apparatus, or device). In terms of this specification, "computer readable medium" may be any device that may contain, store, communicate, propagate, or transport a program for use by or in connection with an instruction execution system, apparatus, or device. More specific examples (non-exhaustive list) of computer readable media include the following: electrical connections (electronic devices) with one or more wirings, portable computer disk cartridges (magnetic devices), random access memory (RAM), read only memory (ROM), erasable editable read only memory (EPROM or flash memory), fiber optic devices, and portable optical disk read only memory (CDROM). In addition, the computer readable medium may even be paper or other suitable medium on which the program can be printed, because the program can be electronically obtained, for example, by optically scanning the paper or other medium, followed by editing, interpreting, or processing in other suitable ways if necessary, and then stored in a computer memory.

It should be understood that various parts of the present disclosure may be implemented in hardware, software, firmware, or combinations thereof. In the above-described implementations, multiple actions or methods may be implemented in software or firmware stored in memory and executed by a suitable instruction execution system. For example, if implemented in hardware, as in another implementation, it can be implemented by any one or a combination of the following techniques known in the art: discrete logic circuits with logic gates for implementing logic functions on data signals, application-specific integrated circuits with suitable combinational logic gates, programmable gate arrays (PGA), field programmable gate arrays (FPGA), etc.

Those of ordinary skill in the art may understand that all or part of the actions carried by the method for implementing the above implementations can be accomplished by instructing relevant hardware through a program that can be stored in a computer readable storage medium. The program, when executed, includes one or a combination of actions of the method implementations.

In addition, each functional unit in various implementations of the present disclosure may be integrated in one processing module, or each unit may exist physically alone, or two or more units may be integrated in one module. The above-mentioned integrated modules can be implemented in the form of hardware or software functional modules. The integrated module can also be stored in a computer readable storage medium if it is implemented in the form of a software function module and sold or used as an independent product. The storage medium mentioned above may be read only memory, magnetic disk or optical disk, etc.

Although implementations of the present disclosure have been shown and described above, it can be understood that the above-mentioned implementations are exemplary and cannot be understood as limitations of the present disclosure, and those skilled in the art can make changes, modifications, substitutions and variations to the above-mentioned implementations within the scope of the present disclosure.

What is claimed is:

1. A method for imaging control comprising:
a processor of an imaging device, wherein the processor:
obtaining an environment luminance of a shooting environment;
obtaining a first gain index according to the environment luminance of the shooting environment and a preset target luminance, wherein the first gain index is used for indicating luminance of current, environment, and wherein a difference between the environment, luminance and a target luminance, a gain, and a gain index have a one-to-one corresponding relationship;
in response to the first gain index being less than a preset gain index, determining a bright light mode for shooting; and
in response to the first gain index being greater than the preset gain index, determining a dark light mode for shooting,
wherein shooting modes of the image device comprise the bright light mode and the dark light mode.

2. The method of claim 1, further comprising:
in response to the first gain index being equal to the preset gain index, determining the bright light mode or the dark light mode for shooting.

3. The method of claim 2, wherein the switching condition information further comprises a preset gain index range, the preset gain index is within the preset gain index range, and the method further comprises:
obtaining a second gain index in response to determining the dark light mode for shooting;
keeping the dark light mode for shooting when the second gain index is larger than or equal to a lower limit of the preset gain index range; and
switching to the bright light mode for shooting when the second gain index is less than the lower limit of the preset gain index range.

4. The method of claim 3, further comprising:
obtaining a third gain index when the second gain index is between the lower limit of the preset gain index range and the preset gain index, and counting a duration when gain indices obtained continuously are between the lower limit of the preset gain index range and the preset gain index; and
switching to the bright light mode for shooting when the duration is larger than a preset duration.

5. The method of claim 1, wherein the switching condition information comprises a preset gain index range, and determining the shooting mode for shooting according to the first gain index and the preset switching condition information comprises:
when the first gain index is less than a lower limit of the preset gain index range, determining the bright light mode for shooting;
when the first gain index is larger than an upper limit of the preset gain index range, determining the dark light mode for shooting; and
when the first gain index is within the preset gain index range, determining the bright light mode or the dark light mode for shooting or keeping the shooting mode unchanged.

6. The method of claim 1, wherein the preset gain index is within a preset gain index range, and the method further comprises:
obtaining a second gain index in response to determining the bright light mode for shooting;
keeping the bright light mode for shooting when the second gain index is less than or equal to the upper limit of the preset gain index range; and
switching to the dark light mode for shooting when the second gain index is larger than the upper limit of the preset gain index range.

7. The method of claim 6, further comprising:
obtaining a third gain index when the second gain index is between the preset gain index and the upper limit of the preset gain index range, and counting a duration when gain indices obtained continuously are between the preset gain index and the upper limit of the preset gain index range; and
switching to the dark light mode for shooting when the duration is larger than a preset duration.

8. The method of claim 1, wherein obtaining the environment luminance comprises:

shooting a scene of the shooting environment to obtain a scene image;

processing the scene image to obtain a main body and a background of the scene image; and determining the environment luminance according to the difference between luminance of the main body and luminance of the background.

9. The method of claim 8, wherein determining the environment luminance according to the difference between luminance of the main body and luminance of the background comprises:

when the difference between luminance of the main body and luminance of the background is larger than a preset difference, calculating a main body weight and a background weight according to the difference;

adjusting the luminance of the main body and the luminance of the background according to the main body weight and the background weight respectively; and calculating an average luminance of the adjusted luminance of the main body and the adjusted luminance of the background as the environment luminance.

10. The method of claim 8, wherein determining the environment luminance according to the difference between luminance of the main body and luminance of the background, comprises:

when the difference between luminance of the main body and luminance of the background is less than or equal to a preset difference, calculating an average luminance of the luminance of the main body and the luminance of the background as the environment luminance.

11. An imaging device, comprising:

a processor; and a memory storing computer readable instructions that are executable by the processor to perform actions of:

obtaining an environment luminance of a shooting environment;

obtaining a first gain index according to the environment luminance of the shooting environment and a preset target luminance, wherein the first gain index is used for indicating luminance of current environment, and wherein a different between the environment luminance and a target luminance, a gain, and a gain index have a one-to-one corresponding relationship;

in response to the first gain index being less than a preset gain index, determining a bright light mode for shooting, and in response to the first gain index being greater than the preset gain index, determining a dark light mode, wherein shooting modes of the imaging device comprise the bright light mode and the dark light mode.

12. The imaging device of claim 11, further comprising a pixel cell array, the pixel cell array comprising a plurality of pixel cells, wherein:

each pixel cell comprises a long exposure pixel, a medium exposure pixel and a short exposure pixel; and an exposure time of the long exposure pixel is longer than an exposure time of the medium exposure pixel, and an exposure time of the medium exposure pixel is longer than an exposure time of the short exposure pixel.

13. The imaging device of claim 12, wherein the processor, when executing the computer readable instructions, further performs actions of:

controlling the pixel cell array to output a plurality of pieces of original pixel information under different exposure time;

calculating merged pixel information respectively according to pieces of the original pixel information with same exposure time in a same pixel cell; and outputting a result of shooting in the bright light mode according to a plurality of pieces of the merged pixel information.

14. The imaging device of claim 12, wherein the processor, when executing the computer readable instructions, further performs actions of:

controlling the pixel cell array to output a plurality of pieces of original pixel information under different exposure time;

calculating combined pixel information respectively by combining pieces of the original pixel information in a same pixel cell, each pixel cell corresponding to one piece of combined pixel information; and outputting a result of shooting in the dark light mode according to a plurality of pieces of the combined pixel information.

15. The imaging device of claim 11, wherein the computer readable instructions are further executable by the processor to perform actions of:

in response to the first gain index being equal to the preset gain index, determining the bright light mode or the dark light mode for shooting.

16. The imaging device of claim 15, wherein the switching condition information further comprises a preset gain index range, the preset gain index is within the preset gain index range, and the processor, when executing the computer readable instructions, further performs actions of:

obtaining a second gain index in response to determining the dark light mode for shooting;

keeping the dark light mode for shooting when the second gain index is larger than or equal to a minimum of the preset gain index range; and switching to the bright light mode for shooting when the second index is less than the minimum of the preset gain index range.

17. The imaging device of claim 16, wherein the processor, when executing the computer readable instructions, further performs actions of:

obtaining a third gain index when the second gain index is between the minimum of the preset gain index range and the preset gain index, and counting a duration when gain indices obtained continuously are between the minimum of the preset gain index range and the preset gain index; and switching to the bright light mode for shooting when the duration is larger than a preset duration.

18. The imaging device of claim 11, wherein the preset gain index is within a preset gain index range, and the processor, when executing the computer readable instructions, further performs actions of:

obtaining a second gain index in response to determining the bright light mode for shooting;

keeping the bright light mode for shooting when the second gain index is less than or equal to a maximum of the preset gain index range; and switching to the dark light mode for shooting when the second gain index is larger than the maximum of the preset gain index range.

19. The imaging device of claim 18, wherein the processor, when executing the computer readable instructions, further performs actions of:

obtaining a third gain index when the second gain index is between the preset gain index and the maximum of the preset gain index range, and counting a duration when gain indices obtained continuously are between the preset gain index and the maximum of the preset gain index range; and when the duration is larger than a preset duration, switching to the dark light mode for shooting.

20. A non-transitory computer readable storage medium, comprising computer executable instructions that are executable by a processor of an image device to:

obtain an environment luminance of a shooting environment;

obtain a first gain index according to the environment luminance of the shooting environment and a preset target luminance, wherein the first gain index is used for indicating luminance of current environment, and wherein a difference between the environment luminance and a target luminance, a gain, and a gain index have a one-to-one corresponding relationship;

in response to the first gain index being less than a preset gain index, determine a bright light mode for shooting; and in response to the first gain index being greater than the preset gain index, determine a dark light mode for shooting, wherein the shooting modes of the image device comprise the bright light mode and the dark light mode.

* * * * *